US010136008B2

(12) United States Patent
Tsunekawa

(10) Patent No.: US 10,136,008 B2
(45) Date of Patent: Nov. 20, 2018

(54) IMAGE PROCESSING SYSTEM THAT PERFORMS PREVIEW DISPLAY, IMAGE PROCESSING APPARATUS, DISPLAY CONTROL APPARATUS, DISPLAY CONTROL METHOD, AND STORAGE MEDIUM

(71) Applicant: CANON KABUSHIKI KAISHA, Tokyo (JP)

(72) Inventor: Kiyohiro Tsunekawa, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/690,955

(22) Filed: Aug. 30, 2017

(65) Prior Publication Data

US 2018/0091658 A1 Mar. 29, 2018

(30) Foreign Application Priority Data

Sep. 29, 2016 (JP) .................................. 2016-191259

(51) Int. Cl.
*G06K 15/00* (2006.01)
*H04N 1/00* (2006.01)

(52) U.S. Cl.
CPC ......... *H04N 1/0044* (2013.01); *H04N 1/0049* (2013.01); *H04N 1/00469* (2013.01); *H04N 2201/0094* (2013.01)

(58) Field of Classification Search
None
See application file for complete search history.

(56) References Cited

U.S. PATENT DOCUMENTS

2011/0238743 A1* 9/2011 Kikuoka ................. H04L 67/36
709/203
2012/0224204 A1* 9/2012 Yamagishi ......... G06K 15/1882
358/1.13

FOREIGN PATENT DOCUMENTS

JP 2014232285 A 12/2014

* cited by examiner

*Primary Examiner* — Huo Long Chen
(74) *Attorney, Agent, or Firm* — Rossi, Kimms & McDowell LLP

(57) ABSTRACT

An image processing system capable of positively performing preview display of contents corresponding to a printed result to be obtained by executing processing based on print data. An MFP acquires a preview image generated based on the print data and bibliography information for managing specification of the print data indicated by the preview image, from a server, and transmits the acquired preview image and bibliography information to a mobile terminal. The mobile terminal performs preview display of the printed result based on the received preview image. The MFP determines whether or not the bibliography information is compatible with the apparatus information indicative of specifications of the MFP, and if the bibliography information is not compatible with the apparatus information, the MFP manipulates the preview image based on the apparatus information, and transmits the manipulated preview image to the mobile terminal.

6 Claims, 17 Drawing Sheets

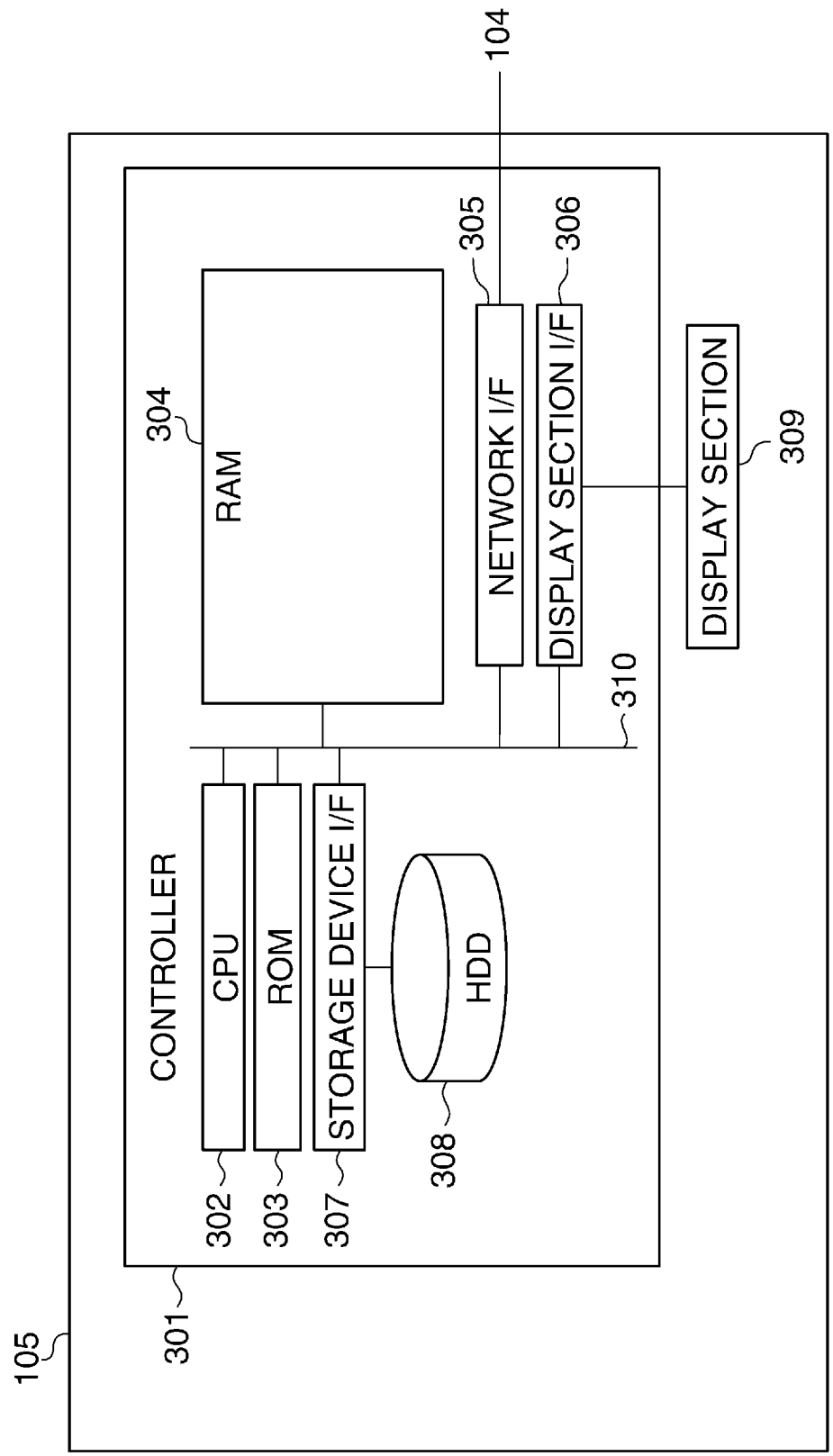

IMAGE PROCESSING SYSTEM THAT PERFORMS PREVIEW DISPLAY, IMAGE PROCESSING APPARATUS, DISPLAY CONTROL APPARATUS, DISPLAY CONTROL METHOD, AND STORAGE MEDIUM

BACKGROUND OF THE INVENTION

Field of the Invention

The present invention relates to an image processing system that performs preview display, an image processing apparatus, a display control apparatus, a display control method, and a storage medium.

Description of the Related Art

There has been known an image processing system that performs authentication printing. In the image processing system, an MFP (Multi-Function Printer) as an image processing apparatus and a server as a communication apparatus are connected to a PC (Personal Computer), a mobile terminal, and so forth, such that data communication can be performed therebetween (see e.g. Japanese Laid-Open Patent Publication (Kokai) No. 2014-232285). In the image processing system, when performing authentication printing, the PC, for example, transmits print data for executing printing of a plurality of pages, not to the MFP, but to the server, and the print data is stored in the server. With this, printing based on the print data is not immediately executed, but the print data is reserved. The print data includes print settings information that specifies a sheet size, execution of color printing, etc., and data of an image of each page. The MFP acquires user information from an IC card of a user, and performs user authentication based on the acquired user information. If the user authentication is successful, the MFP acquires print data associated with the user information from the server, and executes printing based on the print data.

The MFP is capable of performing preview display of a printed result to be obtained by executing printing based on the print data, according to a user's instruction before starting execution of the printing based on the print data, and displays a preview image of each page of the print data on a display section of the MFP as the preview display of the printed result. The preview display of a printed result may be displayed on a display other than the display section of the MFP, such as a display section of a mobile terminal as a display control apparatus that can communicate with the MFP and also can display a Web UI screen formed as a Web page. When user authentication by the MFP is successful, and access to the MFP is permitted, the mobile terminal displays a Web UI screen corresponding to a console panel of the MFP on the display section thereof. With this, even from a location away from the MFP, the user is capable of displaying a preview image of a desired page on the display section of the mobile terminal by operating the Web UI screen to confirm the preview display of the printed result.

In general, although the preview image is generated by the MFP based on the print settings information, if the print data includes complicated contents, a lot of time and resources are sometimes required to analyze the print data. In this case, it takes excessively long time to display the preview image after receipt of a user's instruction. To solve this problem, there has been proposed a technique in which a server generates a preview image of each page of print data based on the print settings information during a time period over which the print data is reserved. This enables the MFP to transmit the preview image generated by the server, as it is, to the mobile terminal without executing processing for generating the preview image, and enables the mobile terminal to quickly perform preview display of a printed result based on the transmitted preview image.

However, the server generates a preview image based on the print settings information without depending on the specifications of the MFP, and hence a preview image may be generated based on the specifications which are not compatible with the MFP. For example, a preview image for color printing may be generated for the MFP that is capable of performing only monochrome printing. As a result, the preview image for color printing is displayed on the mobile terminal as the preview display of a printed result to be generated by the MFP that is capable of performing only monochrome printing. That is, in the conventional image processing system, in a case where the print settings information of the print data is not compatible with the specifications of the MFP, it is impossible to perform the preview display of contents corresponding to a printed result to be obtained by the MFP that executes printing based on the print data.

SUMMARY OF THE INVENTION

The present invention provides an image processing system that is capable of positively performing preview display of contents corresponding to a printed result to be obtained by executing processing based on print data, an image processing apparatus, a display control apparatus, a display control method, and a storage medium.

In a first aspect of the present invention, there is provided an image processing system that performs preview display of a result to be obtained by an image processing apparatus which executes processing based on execution data reserved in a communication apparatus, on a display control apparatus, comprising an acquisition unit configured to acquire a preview image generated based on the execution data, and bibliography information for managing specifications of the execution data indicated by the preview image, from the communication apparatus, a transmission unit configured to transmit the preview image to the display control apparatus, a preview display unit configured to perform preview display of the result on the display control apparatus based on the transmitted preview image, a determination unit configured to determine whether or not the bibliography information is compatible with the apparatus information indicative of specifications of the image processing apparatus, and a manipulation unit configured to cause, in a case where the bibliography information is not compatible with the apparatus information, the image processing apparatus to manipulate the preview image based on the apparatus information, wherein in a case where the bibliography information is not compatible with the apparatus information, the transmission unit transmits the manipulated preview image to the display control apparatus.

In a second aspect of the present invention, there is provided an image processing system that performs preview display of a result to be obtained by an image processing apparatus which executes processing based on execution data reserved in a communication apparatus, on a display control apparatus, the display control apparatus comprising an acquisition unit configured to acquire a preview image generated based on the execution data, bibliography information for managing specifications of the execution data indicated by the preview image, and apparatus information indicative of specifications of the image processing apparatus, from the image processing apparatus, a preview display unit configured to perform preview display of the result based on the preview image, a determination unit configured to determine whether or not the bibliography information is compatible with the apparatus information, and a manipulation unit configured to manipulate, in a case where the bibliography information is not compatible with the apparatus information, the preview image of the execution data based on the apparatus information, wherein in a case where the bibliography information is not compatible with the apparatus information, the preview display unit performs preview display of the result based on the manipulated preview image.

In a third aspect of the present invention, there is provided an image processing apparatus that controls execution of preview display of a result to be obtained by executing processing based on execution data reserved in a communication apparatus, comprising an acquisition unit configured to acquire a preview image generated based on the execution data, and bibliography information for managing specifications of the execution data indicated by the preview image, from the communication apparatus, a transmission unit configured to transmit the preview image to a display control apparatus that performs preview display of the result, a determination unit configured to determine whether or not the bibliography information is compatible with the apparatus information indicative of specifications of the image processing apparatus, and a manipulation unit configured to process, in a case where the bibliography information is not compatible with the apparatus information, the preview image based on the apparatus information, wherein in a case where the bibliography information is not compatible with the apparatus information, the transmission unit transmits the manipulated preview image to the display control apparatus.

In a fourth aspect of the present invention, there is provided a display control apparatus that performs preview display of a result to be obtained by an image processing apparatus which executes processing based on execution data reserved in a communication apparatus, comprising an acquisition unit configured to acquire a preview image generated based on the execution data, bibliography information for managing specifications of the execution data indicated by the preview image, and apparatus information indicative of specifications of the image processing apparatus, from the image processing apparatus, a preview display unit configured to perform preview display of the result based on the preview image, a determination unit configured to determine whether or not the bibliography information is compatible with the apparatus information, and a manipulation unit configured to manipulate, in a case where the bibliography information is not compatible with the apparatus information, the preview image of the execution data based on the apparatus information, wherein in a case where the bibliography information is not compatible with the apparatus information, the preview display unit performs preview display of the result based on the manipulated preview image.

In a fifth aspect of the present invention, there is provided a display control method for performing preview display of a result to be obtained by an image processing apparatus which executes processing based on execution data reserved in a communication apparatus, on a display control apparatus, comprising acquiring a preview image generated based on the execution data, and bibliography information for managing specifications of the execution data indicated by the preview image, from the communication apparatus, transmitting the preview image to the display control apparatus, performing preview display of the result on the display control apparatus based on the transmitted preview image, causing the image processing apparatus to determine whether or not the bibliography information is compatible with the apparatus information indicative of specifications of the image processing apparatus, and causing, in a case where the bibliography information is not compatible with the apparatus information, the image processing apparatus to manipulate the preview image based on the apparatus information, wherein said transmitting includes transmitting the manipulated preview image to the display control apparatus in a case where the bibliography information is not compatible with the apparatus information.

In a sixth aspect of the present invention, there is provided a display control method for performing preview display of a result to be obtained by an image processing apparatus which executes processing based on execution data reserved in a communication apparatus, on a display control apparatus, comprising acquiring a preview image generated based on the execution data, bibliography information for managing specifications of the execution data indicated by the preview image, and apparatus information indicative of specifications of the image processing apparatus, from the image processing apparatus, performing preview display of the result based on the preview image, determining whether or not the bibliography information is compatible with the apparatus information, and manipulating, in a case where the bibliography information is not compatible with the apparatus information, the preview image of the execution data based on the apparatus information, wherein said performing the preview display includes, in a case where the bibliography information is not compatible with the apparatus information, performing preview display of the result based on the manipulated preview image.

In a seventh aspect of the present invention, there is provided a non-transitory computer-readable storage medium storing a computer-executable program for executing a display control method for performing preview display of a result to be obtained by an image processing apparatus which executes processing based on execution data reserved in a communication apparatus, on a display control apparatus, wherein the control method comprises acquiring a preview image generated based on the execution data, and bibliography information for managing specifications of the execution data indicated by the preview image, from the communication apparatus, transmitting the preview image to the display control apparatus, performing preview display of the result on the display control apparatus based on the transmitted preview image, causing the image processing apparatus to determine whether or not the bibliography information is compatible with the apparatus information indicative of specifications of the image processing apparatus, and causing, in a case where the bibliography information is not compatible with the apparatus information, the image processing apparatus to manipulate the preview image based on the apparatus information, wherein said transmitting includes transmitting the manipulated preview image to the display control apparatus in a case where the bibliography information is not compatible with the apparatus information.

In an eighth aspect of the present invention, there is provided a non-transitory computer-readable storage medium storing a computer-executable program for executing a display control method for performing preview display of a result to be obtained by an image processing apparatus which executes processing based on execution data reserved in a communication apparatus, on a display control apparatus, wherein the control method comprises acquiring a preview image generated based on the execution data, bibliography information for managing specifications of the execution data indicated by the preview image, and apparatus information indicative of specifications of the image processing apparatus, from the image processing apparatus, performing preview display of the result based on the preview image, determining whether or not the bibliography information is compatible with the apparatus information, and manipulating, in a case where the bibliography information is not compatible with the apparatus information, the preview image of the execution data based on the apparatus information, wherein said performing the preview display includes, in a case where the bibliography information is not compatible with the apparatus information, performing preview display of the result based on the manipulated preview image.

According to the present invention, it is possible to positively perform preview display of contents corresponding to a printed result to be obtained by executing processing based on print data.

Further features of the present invention will become apparent from the following description of exemplary embodiments (with reference to the attached drawings).

BRIEF DESCRIPTION OF THE DRAWINGS

FIG. 3 is a schematic block diagram of a hardware configuration of a mobile terminal appearing in FIG. 1.

DESCRIPTION OF THE EMBODIMENTS

The present invention will now be described in detail below with reference to the accompanying drawings showing embodiments thereof.

Although in the present embodiment, a description will be given of a case where the present invention is applied to an MFP as an image processing apparatus, the present invention is not limitedly applied to the MFP. For example, the present invention can be applied to any other apparatuses insofar as it is an apparatus that is capable of executing image processing of a preview image, such as an LBP (Laser Beam Printer) and an SFP (Single Function Printer). Further, although in the present embodiment, a description will be given of a case where the present invention is applied to a mobile terminal as a display control apparatus, the present invention is not limitedly applied to the mobile terminal. For example, the present invention can be applied to any other apparatuses insofar as it is an apparatus that is capable of performing preview display of a printed result, such as a PC.

Figure 1:
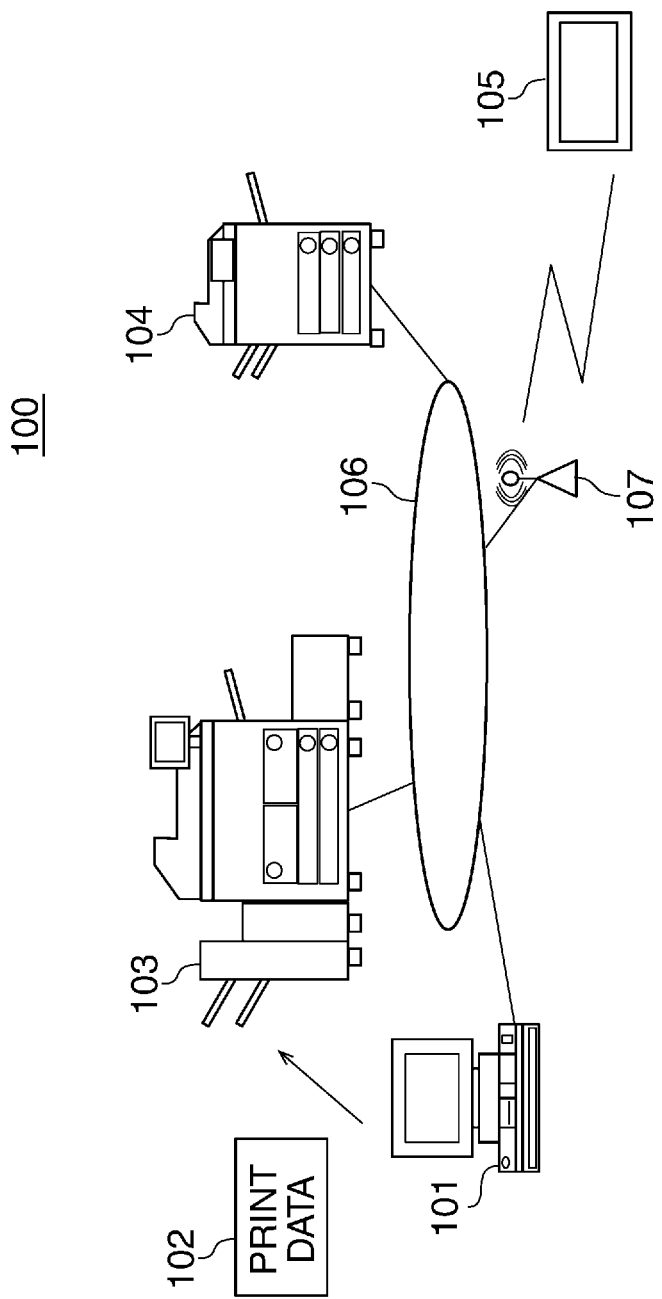
FIG. 1 is a schematic block diagram of an image processing system according to a first embodiment of the present invention.

FIG. 1 is a schematic block diagram of an image processing system 100 according to a first embodiment of the present invention.

Referring to FIG. 1, the image forming system 100 is comprised of a PC 101, a server 103 as a communication apparatus, an MFP 104 as an image processing apparatus, and a mobile terminal 105 as a display control apparatus. The PC 101, the server 103, and the MFP 104 are connected via a network 106. The mobile terminal 105 can communicate with the PC 101, the server 103, and the MFP 104, which are connected to the network 106, via a wireless access point 107.

The PC 101 transmits print data, such as print data 102 (execution data) for printing a plurality of pages, to the server 103 when authentication printing is performed. The print data 102 is formed by a PDL (Page Description Language). The print data 102 includes user information that identifies a user who has instructed transmission of the print data 102, print settings information that specifies a sheet size, execution of color printing or monochrome printing, and so forth, data associated with an image of each page, etc. Although in the present embodiment, a case where the PC 101 transmits the print data 102 to the server 103 will be described by way of example, the transmission source of the print data 102 is not limited to the PC 101. For example, the transmission source of the print data 102 may be the mobile terminal 105.

Upon receipt of the print data 102 from the PC 101, the server 103 manages the print settings information of the print data 102 using bibliography information 511, described hereinafter with reference to FIG. 5. Further, the server 103 has an image processing function, and generates a preview image of each page of the print data 102. The preview image is an image dedicated to the preview display, and is not used for other purposes, such as printing. The server 103 generates preview images of part of the print data 102, e.g. of such a number of pages as will not cause shortage of resources of the server 103 and makes it possible to reduce load on the preview image generation processing of the MFP 104. In the present embodiment, for example, it is assumed that the preview images of the four pages of first to fourth pages are generated by the server 103. The server 103 stores the preview image of each page generated thereby (hereinafter referred to as the "server generated image"), in association with the print data 102, and manages the server generated images using the bibliography information 511, described hereinafter. Further, upon receipt of a notification for requesting transmission of the print data 102 from the MFP 104, the server 103 transmits the print data 102 and the bibliography information 511, described hereinafter, to the MFP 104 in response to the request notification.

The MFP 104 reads user information from an IC card of a user, and performs user authentication based on the read user information. If the user authentication is successful, the MFP 104 transmits a notification for requesting transmission of the print data 102 associated with the user information to the server 103, and acquires the desired print data 102 and the bibliography information 511, described hereinafter, from the server 103. Further, the MFP 104 acquires a server generated image of a desired page from the server 103 based on the bibliography information 511, described hereinafter, and transmits the acquired server generated image to the mobile terminal 105.

The mobile terminal 105 displays a Web UI screen formed as a Web page, such as a Web UI screen corresponding to a console panel of the MFP 104. Further, the mobile terminal 105 displays the preview image received from the MFP 104 as the preview display of the print data 102.

Figure 2:
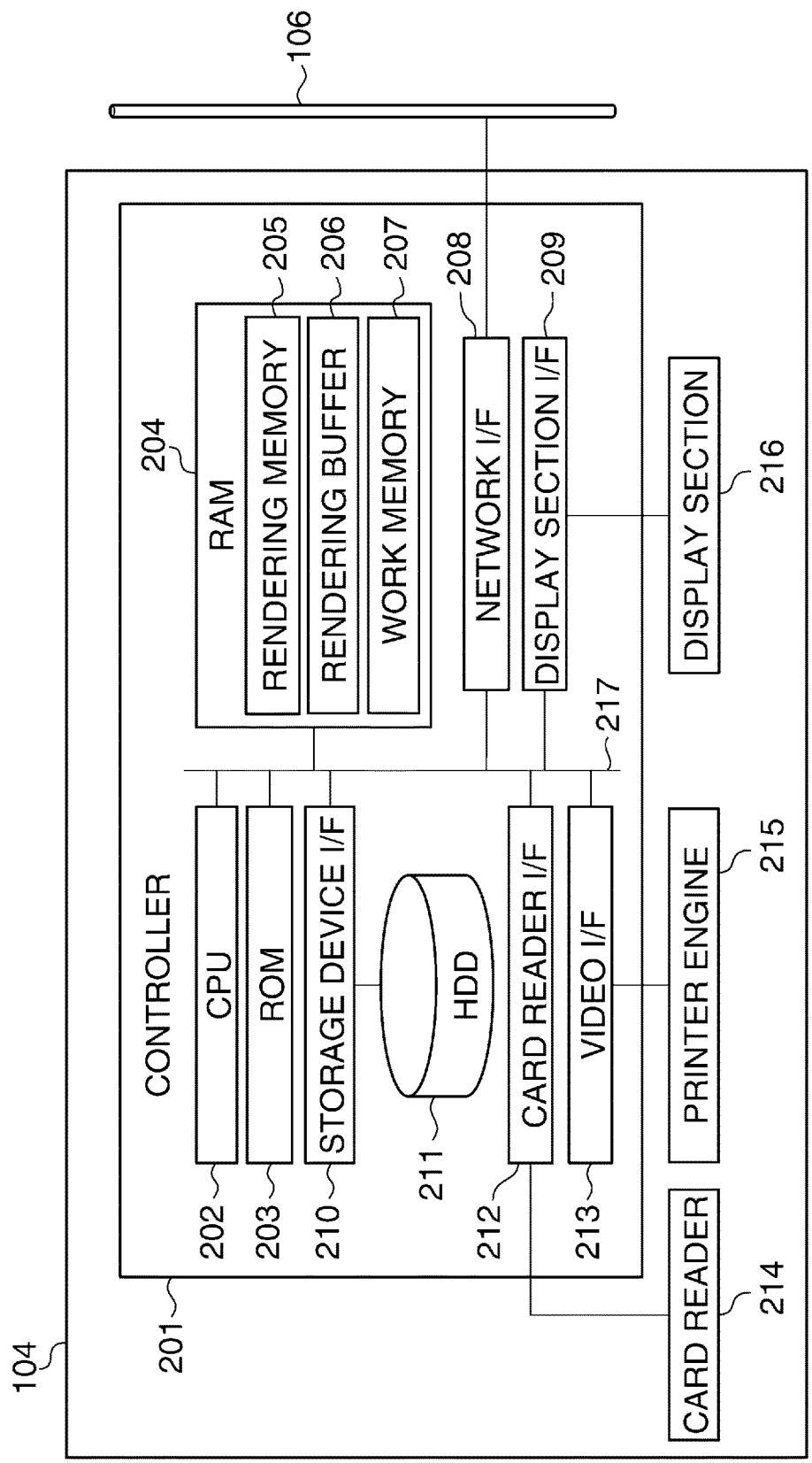
FIG. 2 is a schematic block diagram of a hardware configuration of an MFP appearing in FIG. 1.

FIG. 2 is a schematic block diagram of a hardware configuration of the MFP 104 appearing in FIG. 1.

Referring to FIG. 2, the MFP 104 includes a controller 201, a card reader 214, a printer engine 215, and a display section 216, and the controller 201 is connected to the card reader 214, the printer engine 215, and the display section 216. The controller 201 includes a CPU 202, a ROM 203, a RAM 204, a network interface 208, a display section interface 209, a storage device interface 210, an HDD 211, a card reader interface 212, and a video interface 213. The CPU 202, the ROM 203, the RAM 204, the network interface 208, the display section interface 209, the storage device interface 210, the card reader interface 212, and the video interface 213 are interconnected via a system bus 217. The HDD 211 is connected to the storage device interface 210.

The controller 201 controls the overall operation of the MFP 104. The CPU 202 executes programs stored in the ROM 203 to perform processing operations of a control module group 501, described hereinafter with reference to FIG. 5. The ROM 203 stores the programs executed by the CPU 202, configuration data, and so forth. The RAM 204 is a volatile memory that can hold each data item as long as electric power is supplied to the MFP 104. The RAM 204 includes a rendering memory 205, a rendering buffer 206, and a work memory 207. The rendering memory 205 temporarily stores a rendering object generated based on results of analysis of the print data 102. The rendering buffer 206 functions as a storage area allocated to each data item generated in rendering the rendering object and each data item generated in generating an image data item of each page. The work memory 207 functions as a loading area allocated to each program loaded from the HDD 211 and a heap area which is a work area for the CPU 202.

The network interface 208 performs data communication with the PC 101, the server 103, and the mobile terminal 105, which are connected thereto via the network 106. The display section interface 209 performs data communication with the display section 216, and the storage device interface 210 performs data communication with the HDD 211. The HDD 211 stores programs and various data. For example, the HDD 211 stores the print data 102 and the bibliography information 511, described hereinafter, which are received from the server 103. The card reader interface 212 performs data communication with the card reader 214, and the video interface 213 performs data communication with the printer engine 215.

The card reader 214 acquires user information from an IC card held over the card reader 214 by a user, and sends the acquired user information to the CPU 202. Upon receipt of the user information, the CPU 202 performs user authentication based on the acquired user information. The printer engine 215 renders image data of the print data 102, and performs printing on a sheet based on the rendered image data. The display section 216 displays information related to jobs to be executed by the MFP 104, such as list information of print data reserved in the server 103.

FIG. 3 is a schematic block diagram of a hardware configuration of the mobile terminal 105 appearing in FIG. 1.

Referring to FIG. 3, the mobile terminal 105 includes a controller 301 and a display section 309, and the controller 301 is connected to the display section 309. The controller 301 includes a CPU 302, a ROM 303, a RAM 304, a network interface 305, a display section interface 306, a storage device interface 307, and an HDD 308. The CPU 302, the ROM 303, the RAM 304, the network interface 305, the display section interface 306, and the storage device interface 307 are interconnected via a system bus 310. The HDD 308 is connected to the storage device interface 307.

The controller 301 controls the overall operation of the mobile terminal 105. The CPU 302 executes programs stored in the ROM 303 to perform processing operations of a control module group 701, described hereinafter with reference to FIG. 7. The ROM 303 stores the programs executed by the CPU 302, configuration data, and so forth. The RAM 304 is used as a work area for the CPU 302, and is also used as an area for temporarily storing each data item.

Figure 4A:
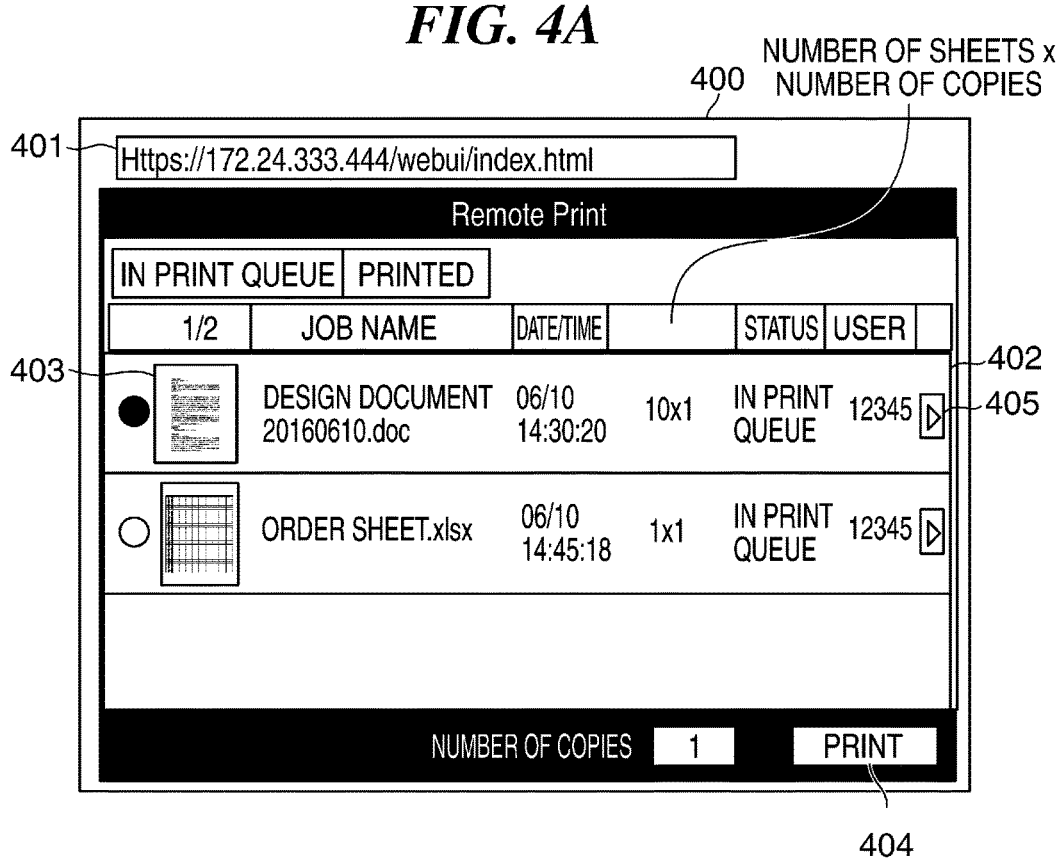
FIGS. 4A and 4B are diagrams each showing an example of a screen displayed on the mobile terminal appearing in FIG. 1.

The network interface 305 performs data communication with the PC 101, the server 103, and the MFP 104, which are connected thereto via the network 106. The display section interface 306 performs data communication with the display section 309, and the storage device interface 307 performs data communication with the HDD 308. The HDD 308 stores programs and various data. The display section 309 has a touch panel function, and displays a Web UI screen, such as a settings screen 400, shown in FIG. 4A, for instructing the start of printing of print data reserved in the server 103. The settings screen 400 includes a URL field 401, list information 402, a print start button 404, and operation buttons 405. In the URL field 401, a URL (Uniform Resource Locator) indicating the settings screen 400 is displayed. In the list information 402, information related to each print data item (hereinafter referred to as the "print data-related information") associated with the user of the mobile terminal 105 is displayed. The print data-related information includes a thumbnail image 403, a name of the print data item, a date and time at which the print data was acquired, the number of pages, the number of copies to be printed, and so forth. The thumbnail image 403 is a size-reduced image of a preview image of each print data item, which is formed by the MFP 104, and the user can identify, based on the thumbnail image 403, whether a printed result of each print data item is in color or monochrome, and the like, to a certain extent. The print start button 404 is an operation button for instructing execution of printing based on a print data item indicated by a selected one of items of the print data-related information (hereafter, also referred to as print data-related information items) displayed on the list information 402. Each operation button 405 is used for instructing display of detailed information of a print data item indicated by a selected one of the print data-related information items displayed on the list information 402.

Figure 4B:
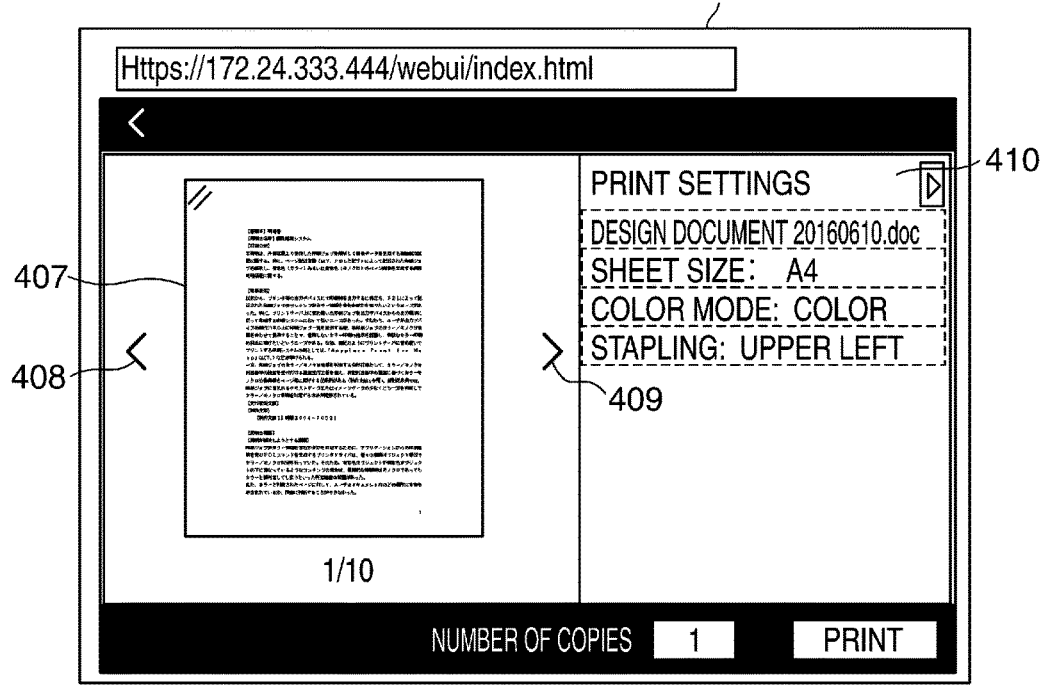

For example, when a print data-related information item indicative of an item of the print data 102 (hereafter, also referred to as a print data item 102) and the operation button 405 associated therewith are selected by the user, a preview screen 406, shown in FIG. 4B, is displayed on the display section 309. The preview screen 406 includes a preview image 407, operation buttons 408 and 409, and print settings 410. The preview image 407 is a preview image of a page number specified e.g. by operating the operation buttons 408 and 409. The operation buttons 408 and 409 are used for displaying a preview image of a page number different from the preview image being displayed. In the print settings 410, there is displayed settings information of the print data 102, including information on the sheet size and information indicative of whether color printing or monochrome printing is to be performed.

Figure 5:
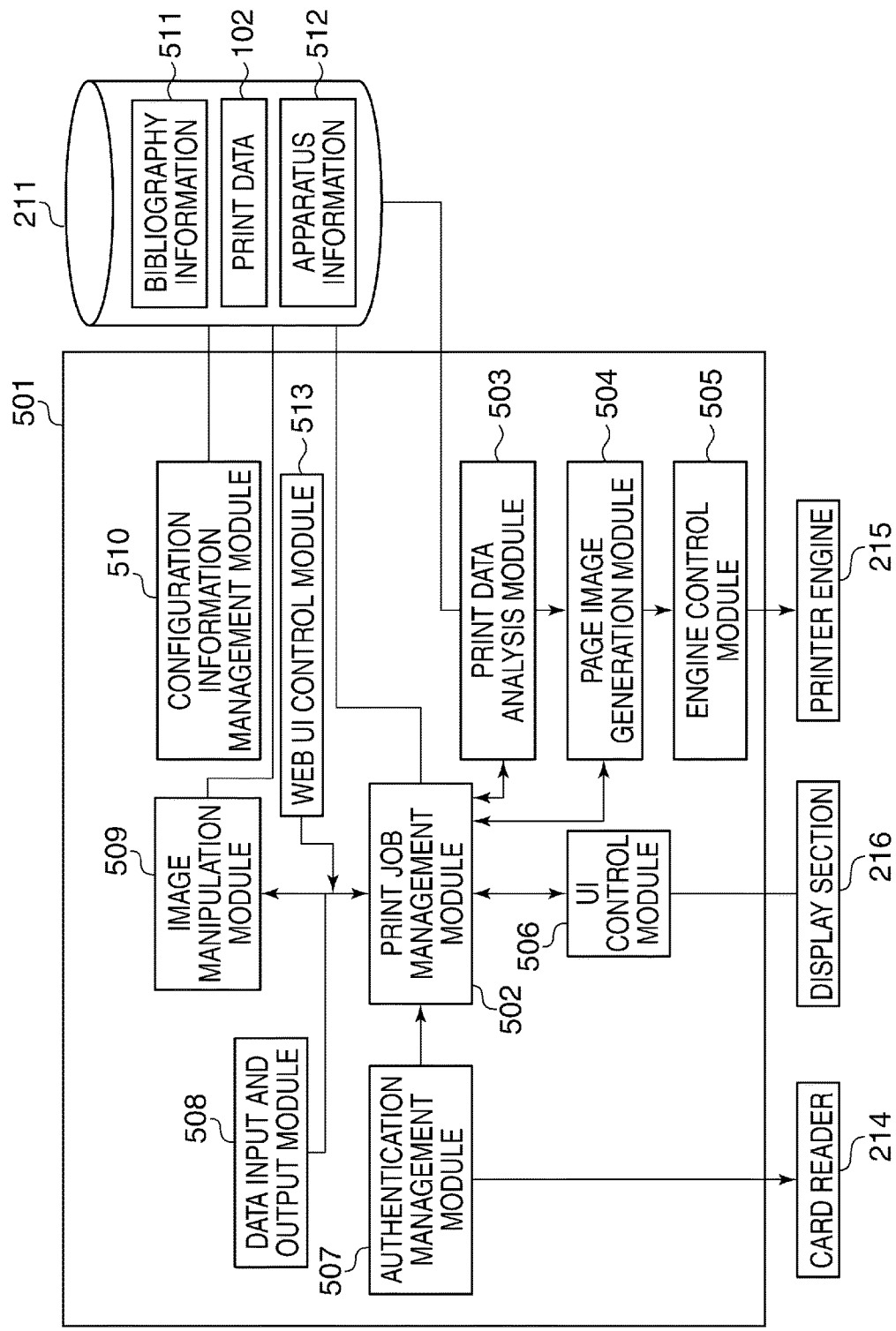
FIG. 5 is a schematic block diagram of a control module group as a group of software modules of the MFP appearing in FIG. 1.

FIG. 5 is a schematic block diagram of the control module group 501 as a group of software modules of the MFP 104 appearing in FIG. 1.

Referring to FIG. 5, the control module group 501 includes a print job management module 502, a print data analysis module 503, a page image generation module 504, and an engine control module 505. Further, the control module group 501 includes a UI control module 506, an authentication management module 507, a data input and output module 508, an image manipulation module 509, a configuration information management module 510, and a Web UI control module 513. Processing operations of the control module group 501 are performed by the CPU 202 executing the programs stored in the ROM 203.

The control module group 501 controls the processing operations performed by the MFP 104. The print job management module 502 manages the print data 102. The print job management module 502 stores a print data item 102 received from the server 103 in the HDD 211. Further, the print job management module 502 instructs the page image generation module 504 to generate a preview image of each page of the print data item 102. In the present embodiment, for example, in a case where six pages of print data and preview images of the first to fourth pages are acquired from the server 103, the print job management module 502 instructs the page image generation module 504 to generate preview images of fifth and subsequent pages. The print job management module 502 requests the print data analysis module 503 to analyze the print data item 102.

The print data analysis module 503 analyzes the print data item 102 so as to acquire print settings information of the print data item 102, and notifies the print job management module 502 of the acquired print settings information. The page image generation module 504 generates a preview image of each page of the print data item 102 at a resolution suitable for the display section 216 and the like, such as 76 dpi. The engine control module 505 generates an image data item of each page, which is to be printed, based on the print data item 102, and sends the generated image data item to the printer engine 215. The UI control module 506 controls the display on the display section 216. The authentication management module 507 performs user authentication by collating information registered in advance for user identification, with user information read by the card reader 214.

Figure 6:
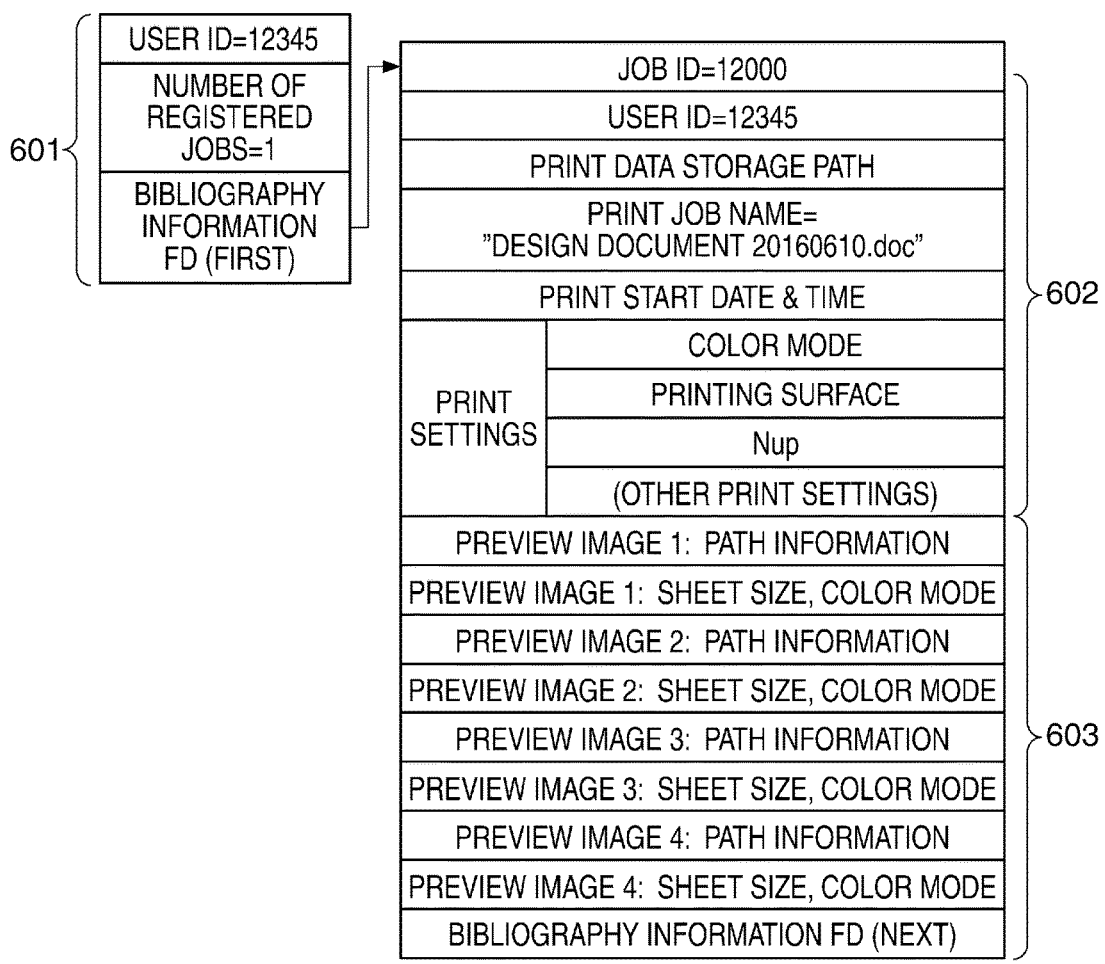
FIG. 6 is a diagram showing an example of bibliography information transmitted from a server appearing in FIG. 1 to the MFP.

The data input and output module 508 controls data communication with the PC 101, the server 103, and the mobile terminal 105. For example, the data input and output module 508 receives a request notification requesting a preview image, from the mobile terminal 105, and transmits the preview image to the mobile terminal 105 in response to the request notification. Further, the data input and output module 508 receives the print data item 102 and the bibliography information 511, which are transmitted from the server 103. The received print data item 102 and bibliography information 511 are stored in the HDD 211. The bibliography information 511 is generated by the server 103, and the server 103 manages the print data items 102, on a user-by-user basis, according to the order of receiving the print data items 102 from the PC 101. Further, the bibliography information 511 manages the specifications of each print data item indicated by the server generated images. As shown in FIG. 6, the bibliography information 511 includes header information 601, attribute information 602, and preview image information 603. The header information 601 stores a user ID for identifying a user, the number of jobs (print data items) registered in association with the user ID for management by the bibliography information 511, and so forth. The attribute information 602 stores a job ID for identifying a print job, a print job name, information indicative of an area whether print data is stored (print data storage path), etc., and information indicative of whether color printing or monochrome printing is to be performed, which are extracted from the print settings information of the print data item. The preview image information 603 stores specifications of the print data item, indicated by the server generated images. The specifications of the print data indicated by the server generated image are, specifically, information indicative of an area storing the server generated image (path information), information indicative of whether the server generated image is a color image or a monochrome image, and the sheet size information of the print data item 102, indicated by the server generated image. That is, in the present embodiment, the MFP 104 can acquire the specifications of each print data item, indicated by server generated images thereof, from the bibliography information 511 without performing analysis of the print data item and the server generated images, which requires a lot of time and resources.

Referring again to FIG. 5, the image manipulation module 509 manipulates a server generated image. The configuration information management module 510 manages apparatus information 512 indicative of the specifications of the MFP 104. The apparatus information 512 includes list information of sheet sizes supported by the MFP 104 (hereinafter referred to as the "supported sheet size information"), information indicative of a standard sheet size of the MFP 104, information indicative of whether or not the MFP 104 supports color printing, the print specifications of the MFP 104, and so forth. The Web UI control module 513 generates html data for displaying a Web UI screen on an external apparatus, such as the mobile terminal 105, and outputs the generated html data to the external apparatus via the data input and output module 508.

Figure 7:
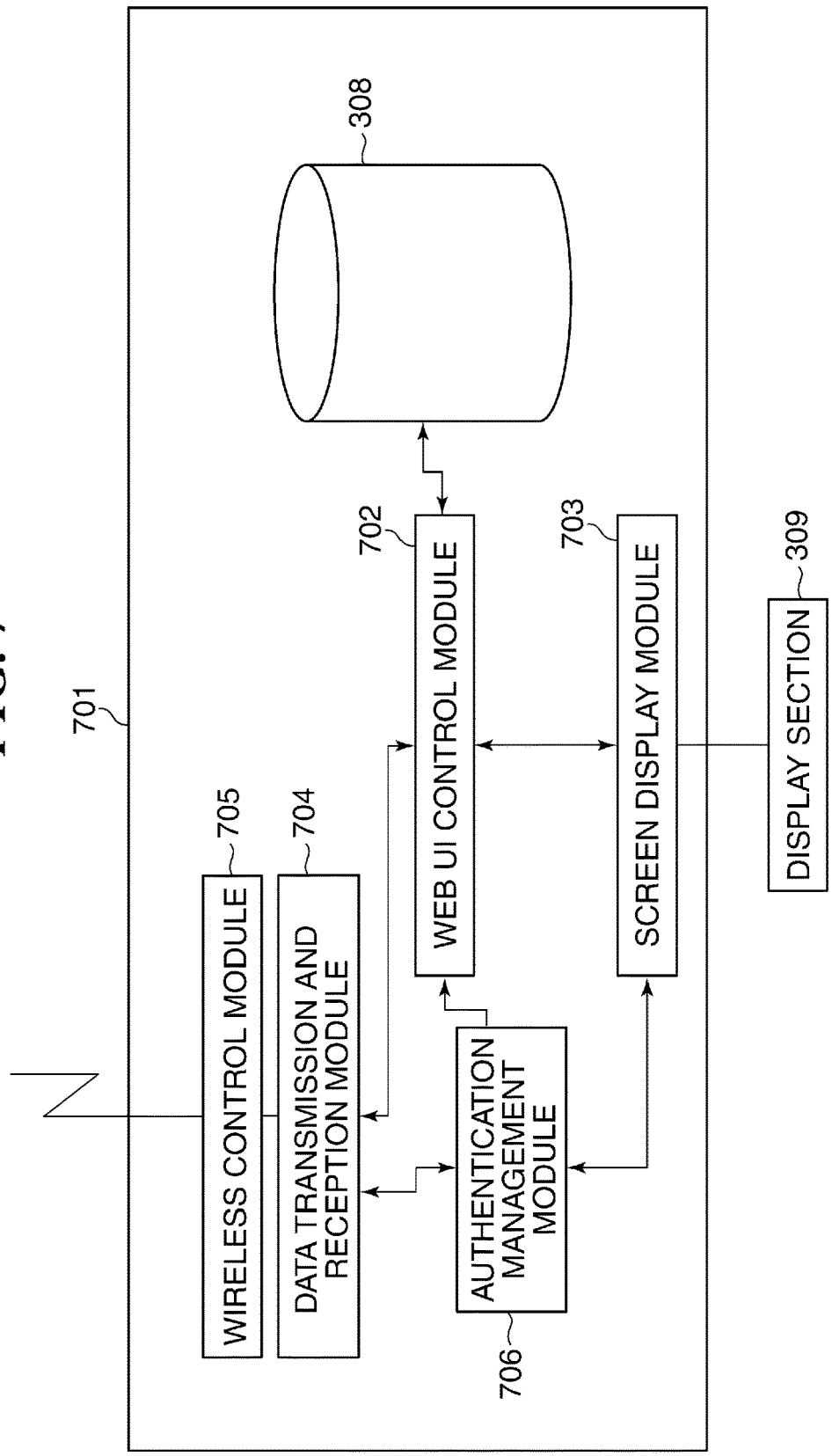
FIG. 7 is a schematic block diagram of a control module group as a group of software modules of the mobile terminal appearing in FIG. 1.

FIG. 7 is a schematic block diagram of the control module group 701 as a group of software modules of the mobile terminal 105, appearing in FIG. 1.

Referring to FIG. 7, the control module group 701 includes a Web UI control module 702, a screen display module 703, a data transmission and reception module 704, a wireless control module 705, and an authentication management module 706. Processing operations of the control module group 701 are performed by the CPU 302 executing the programs stored in the ROM 303.

The Web UI control module 702 controls processing associated with a Web UI screen displayed on the display section 309, and for example, the Web UI control module 702 analyzes an instruction given by an operation on the Web UI screen, for displaying a preview image. The screen display module 703 controls the display on the display section 309, and for example, the screen display module 703 controls the display of the Web UI screen. The data transmission and reception module 704 controls data communication via the network interface 305, and the wireless control module 705 controls execution of wireless communication via the wireless access point 107. The authentication management module 706 performs processing related to authentication of an access to a Web page of the MFP 104. When a user requests an access to a Web page of the MFP 104, the authentication management module 706 performs the processing related to the authentication by consulting user information registered in the server 103.

Figure 8:
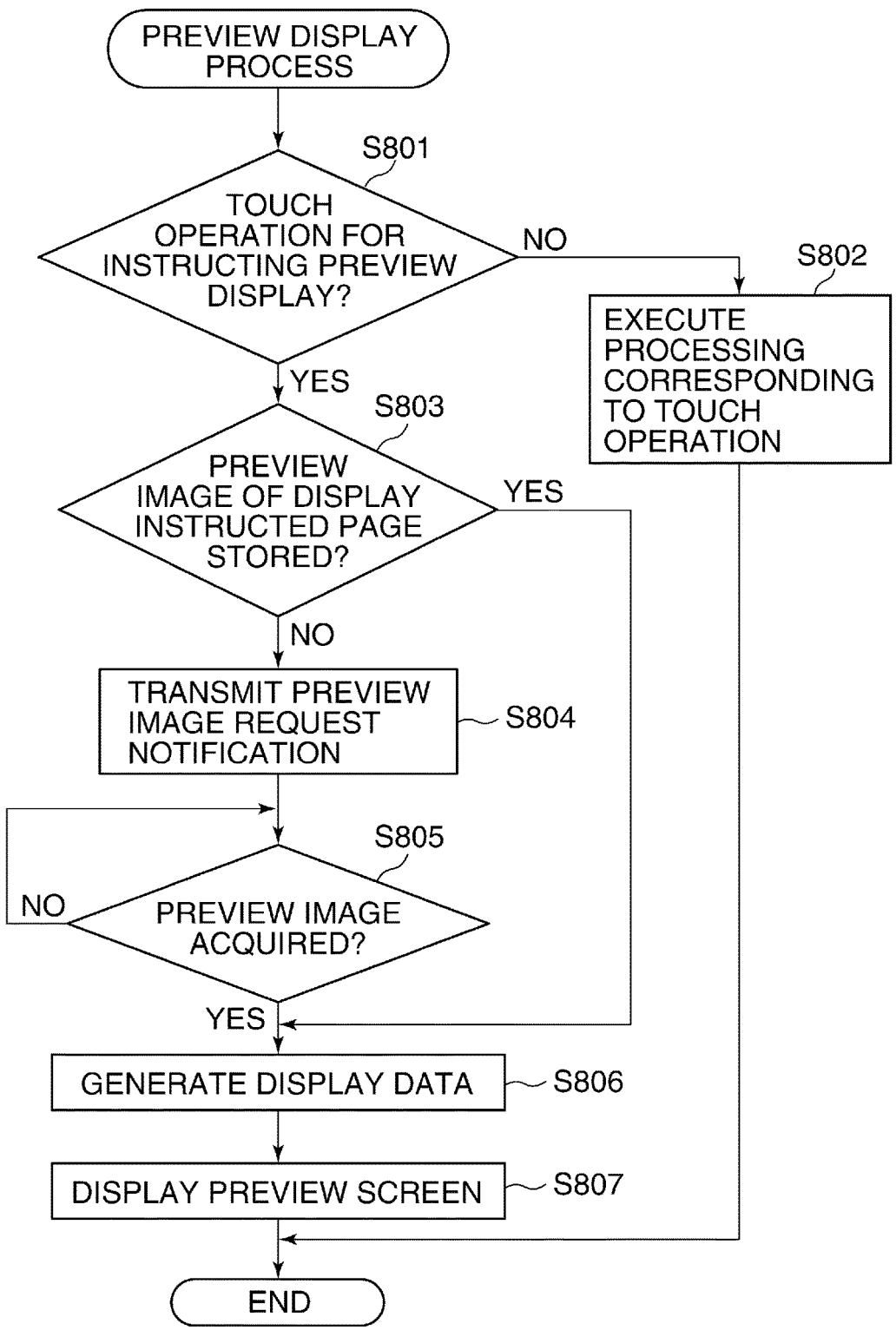
FIG. 8 is a flowchart of a preview display process performed by the mobile terminal appearing in FIG. 1.

FIG. 8 is a flowchart of a preview display process performed by the mobile terminal 105, appearing in FIG. 1.

The preview display process in FIG. 8 is performed by the CPU 302 of the mobile terminal 105, which executes a program stored in the ROM 303, and it is a precondition that the print data item 102 has been transmitted from the PC 101 to the server 103.

Referring to FIG. 8, first, the CPU 302 executes the processing related to authentication of an access to a Web page of the MFP 104, and if the authentication is successful to permit the access to the Web page of the MFP 104, the CPU 302 displays the Web UI screen corresponding to the console panel of the MFP 104 on the display section 309. More specifically, the CPU 302 displays the settings screen 400, shown in FIG. 4A, on the display section 309, and if a touch operation on the settings screen 400 is detected, the CPU 302 determines whether or not the detected touch operation is an operation for instructing the preview display (step S801). In the step S801, if a touch operation for touching one of the operation buttons 405 on the settings screen 400, shown in FIG. 4A, and the operation button 408 and 409 on the preview screen 406, shown in FIG. 4B, is detected, the CPU 302 determines that the detected touch operation is the operation for instructing the preview display. On the other hand, if a touch operation for touching an operation button other than the operation buttons 405, 408, and 409 is detected, the CPU 302 determines that the detected touch operation is not the operation for instructing the preview display.

If it is determined in the step S801 that the detected touch operation is not the operation for instructing the preview display, the CPU 302 executes processing corresponding to the detected touch operation (step S802), followed by terminating the present process. On the other hand, if it is determined in the step S801 that the detected touch operation is the operation for instructing the preview display, the CPU 302 determines whether or not a preview image of a page number instructed to be displayed (hereinafter referred to as the "display instructed page") is stored in the HDD 308 (step S803).

If it is determined in the step S803 that the preview image of the display instructed page is stored in the HDD 308, the CPU 302 executes a step S806 et seq., described hereinafter. On the other hand, if it is determined in the step S803 that the preview image of the display instructed page is not stored in the HDD 308, the CPU 302 transmits a notification for requesting transmission of the preview image of the display instructed page to the MFP 104 (step S804). Upon receipt of this notification, the MFP 104 executes a step S902 et seq. of a preview image transmission process, described hereinafter with reference to FIG. 9. Then, when the CPU 302 acquires the preview image of the display instructed page, e.g. the preview image 407, from the MFP 104 (YES to the step S805), the CPU 302 generates display data for displaying the preview screen 406 (step S806). Then, the CPU 302 displays the preview screen 406 on the display section 309 (step S807), followed by terminating the present process.

Figure 9:
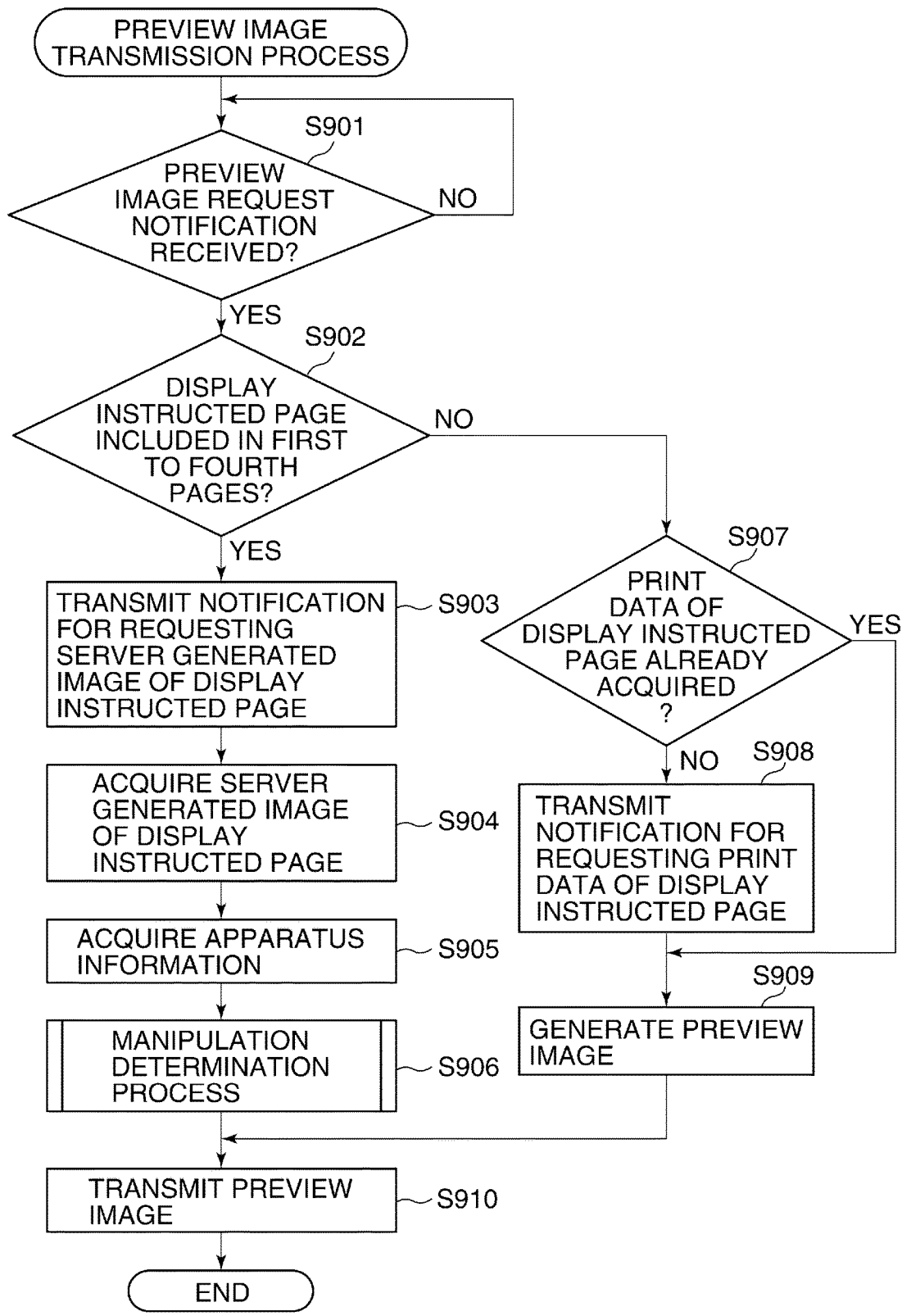
FIG. 9 is a flowchart of a preview image transmission process performed by the MFP appearing in FIG. 1.

FIG. 9 is a flowchart of the preview image transmission process performed by the MFP 104 appearing in FIG. 1, so as to respond to the preview image request notification transmitted from the CPU 302 of the mobile terminal 105 in the step S804 of the preview display process in FIG. 8.

The preview display process in FIG. 9 is performed by the CPU 202 of the MFP 104, which executes a program stored in the ROM 203. Further, it is a precondition for performing the preview display process in FIG. 9 that the MFP 104 has acquired at least the bibliography information 511 from the server 103.

Referring to FIG. 9, first, the CPU 202 determines whether or not a notification for requesting transmission of a preview image of a display instructed page has been received from the mobile terminal 105 (step S901). If the notification for requesting transmission of the preview image of the display instructed page has been received from the mobile terminal 105 (YES to the step S901), the CPU 202 determines based on the bibliography information 511 whether or not the display instructed page corresponds to any page number of the server generated images. More specifically, the CPU 202 determines whether or not the display instructed page is included in the "first to fourth pages" (step S902).

If it is determined in the step S902 that the display instructed page is included in the "first to fourth pages", the CPU 202 transmits a notification for requesting transmission of a server generated image of the display instructed page to the server 103 (step S903). Then, the CPU 202 acquires the server generated image transmitted from the server 103 in response to the request notification (step S904), and stores the acquired server generated image in the HDD 211. Then, the CPU 202 acquires the apparatus information 512 (step S905), and performs a manipulation determination process, described hereinafter with reference to FIG. 10 (step S906), and if the bibliography information 511 is not compatible with the apparatus information 512, the CPU 202 manipulates the server generated image based on the apparatus information 512. Then, the CPU 202 executes a step S910, described hereinafter.

If it is determined in the step S902 that the display instructed page is not included in the "first to fourth pages", the CPU 202 determines whether or not the print data item 102 of the display instructed page has already been acquired (step S907).

If it is determined in the step S907 that the print data item 102 of the display instructed page has already been acquired (YES to the step S907), the CPU 202 executes a step S909, described hereinafter. On the other hand, if it is determined in the step S907 that the print data item 102 of the display instructed page has not been acquired yet (NO to the step S907), the CPU 202 transmits a notification for requesting transmission of the print data item 102 of the display instructed page to the server 103 (step S908). After that, the CPU 202 acquires the print data item 102 of the display instructed page, which is transmitted from the server 103 in response to the request notification. Then, the CPU 202 generates a preview image based on the print data item 102 of the display instructed page and the apparatus information 512 (step S909), and transmits the generated preview image to the mobile terminal 105 (step S910), followed by terminating the present process.

Figure 10:
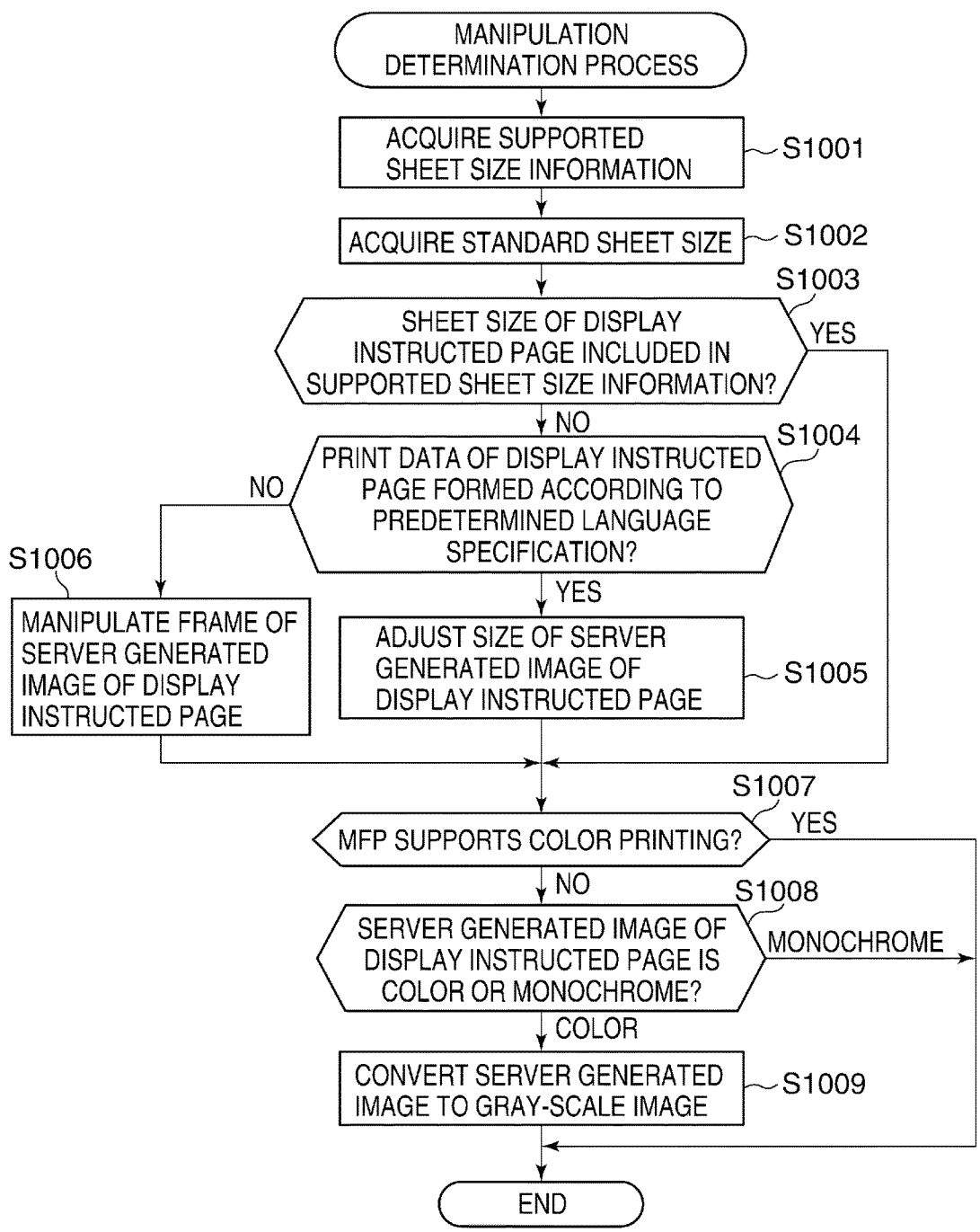
FIG. 10 is a flowchart of a manipulation determination process performed in a corresponding step in FIG. 9.

FIG. 10 is a flowchart of the manipulation determination process performed in the step S906 in FIG. 9.

Referring to FIG. 10, first, the CPU 202 acquires the supported sheet size information from the apparatus information 512 (step S1001), and further, acquires the standard sheet size information of the MFP 104 from the apparatus information 512 (step S1002). Then, the CPU 202 acquires a sheet size indicated by the server generated image of the display instructed page (hereinafter simply referred to as the "sheet size of the display instructed page") from the preview image information 603 of the bibliography information 511. Then, the CPU 202 determines whether or not the sheet size of the display instructed page is included in the supported sheet size information (step S1003).

If it is determined in the step S1003 that the sheet size of the display instructed page is included in the supported sheet size information, the CPU 202 executes a step S1007 et seq., described hereinafter. On the other hand, if it is determined in the step S1003 that the sheet size of the display instructed page is not included in the supported sheet size information, the CPU 202 proceeds to a step S1004 to instruct the image manipulation module 509 to manipulate the server generated image of the display instructed page into an image of the standard sheet size of the MFP 104. That is, in the present embodiment, if the bibliography information 511 is not compatible with the apparatus information 512, in order to manipulate the server generated image based on the apparatus information 512, the CPU 202 determines whether or not the print data item 102 of the display instructed page is formed according to a predetermined language specification (step S1004). In the step S1004, if the print data item 102 of the display instructed page is formed according to a language specification compatible with a Fit to Page function for adjusting the size of print contents of the print data item 102 according to the size of a sheet on which the print data item 102 is to be printed, the CPU 202 determines that the print data item 102 of the display instructed page is formed according to the predetermined language specification. On the other hand, if the print data item 102 of the display instructed page is not formed according to a language specification compatible with the Fit to Page function, the CPU 202 determines that the print data item 102 of the display instructed page is not formed according to the predetermined language specification.

Figures 11A, 11B, 11C:
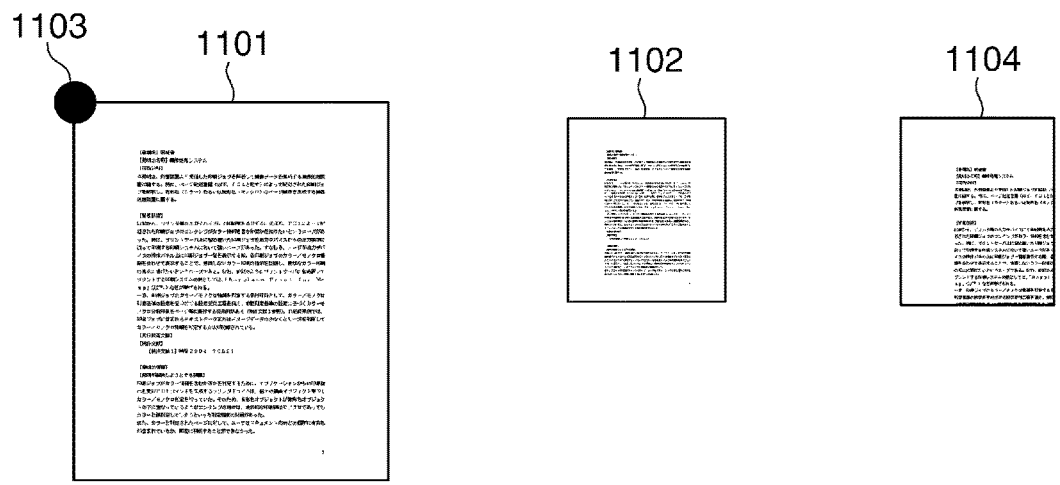
FIGS. 11A to 11C are diagrams useful in explaining manipulation of a preview image in the present embodiment.

If it is determined in the step S1004 that the print data item 102 of the display instructed page is formed according to the predetermined language specification, the CPU 202 manipulates the size of the server generated image of the display instructed page (step S1005). More specifically, the CPU 202 calculates a magnification based on the sheet size of the display instructed page and the standard sheet size of the MFP 104, and adjusts the size of the server generated image based on the calculated magnification. As a result, for example, an A3-sized server generated image 1101, shown in FIG. 11A, is reduced to an A4-sized preview image 1102, shown in FIG. 11B. Then, the CPU 202 executes the step S1007 et seq., described hereinafter.

If it is determined in the step S1004 that the print data item 102 of the display instructed page is not formed according to the predetermined language specification, the CPU 202 manipulates a frame of the server generated image (step S1006). More specifically, the CPU 202 changes only the size of the frame of the server generated image to a size corresponding to the standard sheet size without changing the size of the rendering contents, such as characters, included in the server generated image. By doing this, the CPU 202 manipulates the server generated image 1101, based on the print specifications of the MFP 104 in the apparatus information 512, into a preview image 1104, shown in FIG. 11C, which is formed by cutting out part of the server generated image 1101 to the standard sheet size, using a left top point 1103 on the server generated image 1101 as a reference point. Then, the CPU 202 determines based on the apparatus information 512 whether or not the MFP 104 supports color printing (step S1007).

If it is determined in the step S1007 that the MFP 104 supports color printing, the CPU 202 terminates the present process and proceeds to the step S910 of the above-described preview image transmission process to transmit the preview image to the mobile terminal 105. On the other hand, if it is determined in the step S1007 that the MFP 104 does not support color printing, the CPU 202 determines based on the bibliography information 511 whether the server generated image of the display instructed page is a color image or a monochrome image (step S1008).

If it is determined in the step S1008 that the server generated image of the display instructed page is a monochrome image, the CPU 202 terminates the present process and proceeds to the step S910 of the above-described preview image transmission process. On the other hand, if it is determined in the step S1008 that the server generated image of the display instructed page is a color image, the CPU 202 manipulates the color of the server generated image of the display instructed page (step S1009). More specifically, the CPU 202 converts the server generated image of the display instructed page to a gray-scale image, and then terminates the present process to proceed to the step S910 of the above-described preview image transmission process. Thus, in a case where the bibliography information 511 is not compatible with the apparatus information 512, the server generated image is manipulated such that the sheet size and the color thereof become compatible with the specifications of the MFP 104, and then transmitted to the mobile terminal 105 in the step S910.

According to the above-described processes in FIGS. 8 to 10, if the bibliography information 511 is not compatible with the apparatus information 512, the server generated image is manipulated based on the apparatus information 512, and the manipulated preview image (hereinafter simply referred to as the "manipulated image") is displayed on the display section 309 of the mobile terminal 105. This makes it possible to positively perform the preview display having the contents corresponding to a printed result to be obtained by the MFP 104 executing printing based on the print data item 102.

Further, in the above-described processes in FIGS. 8 to 10, the apparatus information 512 includes the information indicative of whether or not the MFP 104 supports color printing. This makes it possible to avoid a situation in which a preview display shows contents different from a printed result to be obtained by the MFP 104 executing printing based on the print data item 102, such as a situation in which a color preview image is displayed as the preview display of a printed result to be obtained by the MFP 104, which does not support color printing, executing printing based on the print data item 102.

Further, in the above-described processes in FIGS. 8 to 10, the apparatus information 512 includes the information indicative of the supported sheet sizes of the MFP 104. This makes it possible to avoid a situation in which a preview image of one sheet size is displayed as the preview display of a printed result to be obtained by the MFP 104, which does not support the one sheet size, executing printing based on the print data item 102, thereby confusing the user.

Although the description of the present invention is given based on the embodiment, the present invention is not limited to the above-described embodiment.

For example, when a server generated image is manipulated, a warning notification to the effect that the server generated image has been manipulated may be displayed on the display section 309 of the mobile terminal 105.

Figure 12:
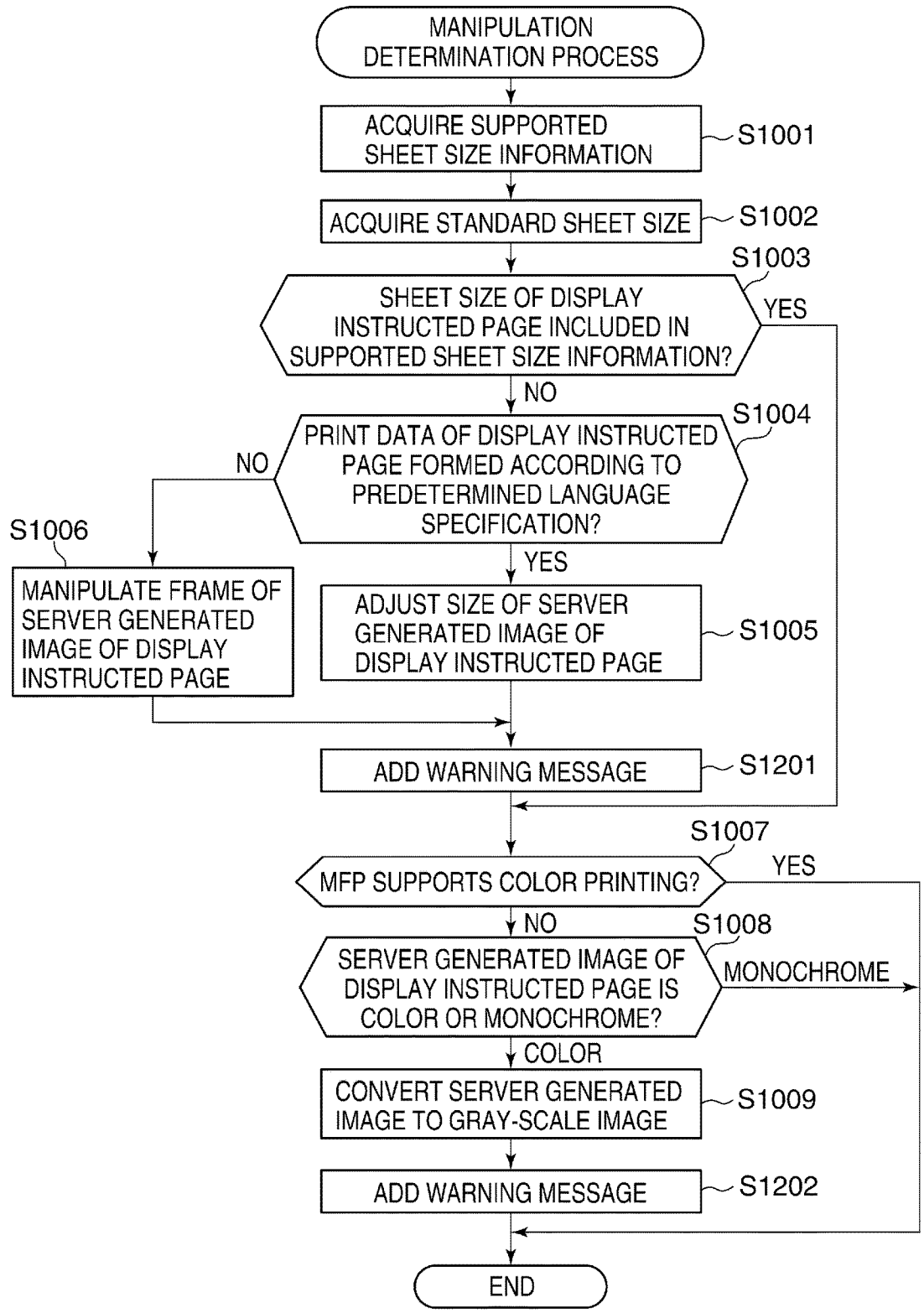
FIG. 12 is a flowchart of a variation of the manipulation determination process in FIG. 10.

FIG. 12 is a flowchart of a variation of the manipulation determination process in FIG. 10.

The manipulation determination process in FIG. 12 is performed by the CPU 202 executing a program stored in the ROM 203.

Referring to FIG. 12, first, the CPU 202 executes the steps S1001 to S1003 described above.

If it is determined in the step S1003 that the sheet size of the display instructed page is included in the supported sheet size information, the CPU 202 executes the step S1007 et seq. On the other hand, if it is determined in the step S1003 that the sheet size of the display instructed page is not included in the supported sheet size information, the CPU 202 executes the step S1004.

Figure 13:
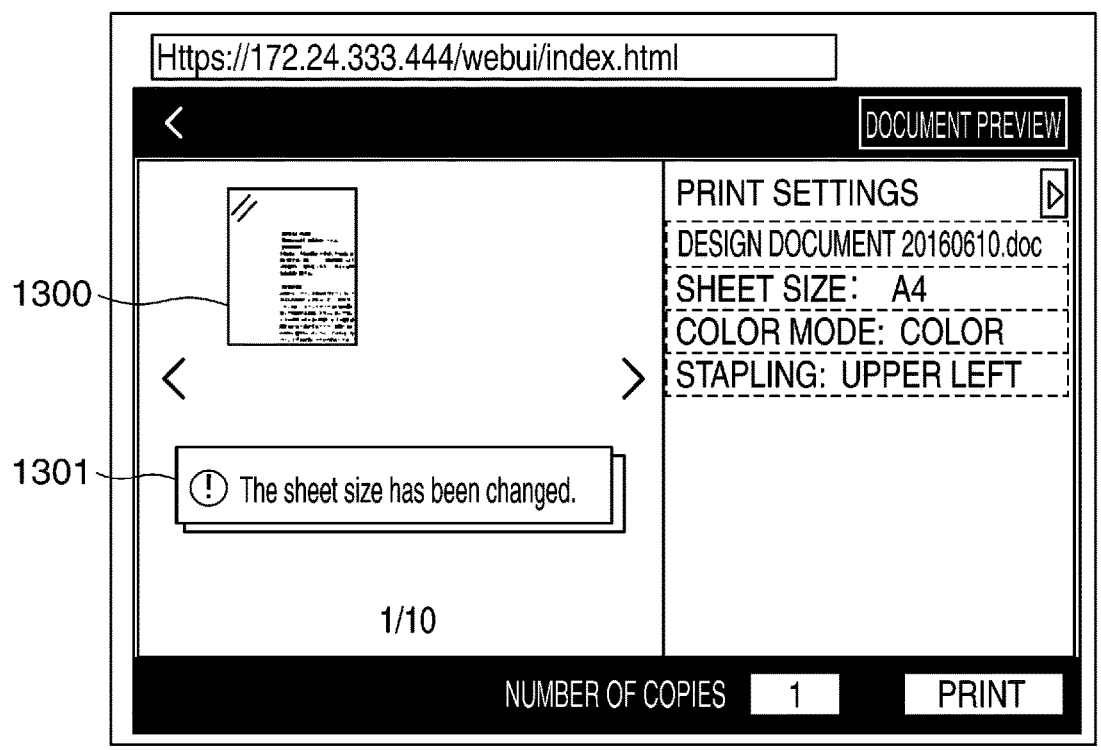
FIG. 13 is a diagram showing an example of a warning message displayed on the mobile terminal appearing in FIG. 1.

If it is determined in the step S1004 that the print data item 102 of the display instructed page is formed according to the predetermined language specification, the CPU 202 executes the step S1005, and then executes a step S1201, described hereinafter. On the other hand, if it is determined in the step S1004 that the print data item 102 of the display instructed page is not formed according to the predetermined language specification, the CPU 202 executes the step S1006. Then, the CPU 202 adds a warning message to the effect that the server generated image has been manipulated, to the manipulated image (step S1201). With this, as shown in FIG. 13, the warning message, denoted by reference numeral 1301, to the effect that the server generated image has been manipulated is displayed on the display section 309 of the mobile terminal 105, together with the manipulated image denoted by reference numeral 1300. Then, the CPU 202 executes the steps S1007 to S1009. Then, the CPU 202 adds a warning message to the effect that the server generated image has been converted to a gray-scale image, to the manipulated image (step S1202), followed by terminating the present process.

In the above-described process in FIG. 12, in a case where the server generated image has been manipulated based on the apparatus information 512, the warning message 1301 to the effect that the server generated image has been manipulated is displayed. This makes it possible to notify a user that the specifications of the print data item 102 are not supported by the MFP 104, to thereby give the user an opportunity to recognize that a desired printed result cannot be obtained from the print data.

In the above-described embodiment, the server 103 may be provided with the component elements of the MFP 104 shown in FIG. 2.

Further, in the above-described embodiment, the server 103 may manipulate the server generated image. For example, when the notification for requesting transmission of a server generated image is received from the MFP 104, the server 103 further acquires the apparatus information 512 from the MFP 104. Then, in a case where the bibliography information 511 is not compatible with the apparatus information 512, the server 103 manipulates the server generated image based on the apparatus information 512, and transmits the manipulated image to the MFP 104. This enables the MFP 104 to positively acquire a preview image formed according to the specifications supported by the MFP 104 from the server 103. Further, in a case where the resources of the MFP 104 for image processing are short, it is possible to reduce the load of image processing of a preview image on the MFP 104.

Further, in the above-described embodiment, the server 103 may transmit a server generated image having the bibliography information 511 added thereto, to the MFP 104. This makes it possible to easily associate the bibliography information 511 and the serve generated image with each other.

Next, a description will be given of a second embodiment of the present invention.

The second embodiment basically has the same configuration and advantageous effects as the above-described first embodiment. However, the second embodiment differs from the first embodiment in that the mobile terminal is provided with an image manipulation module, and hence description of the same configuration and advantageous effects is omitted, but the description is given only of the different configuration and advantageous effects.

Figure 14:
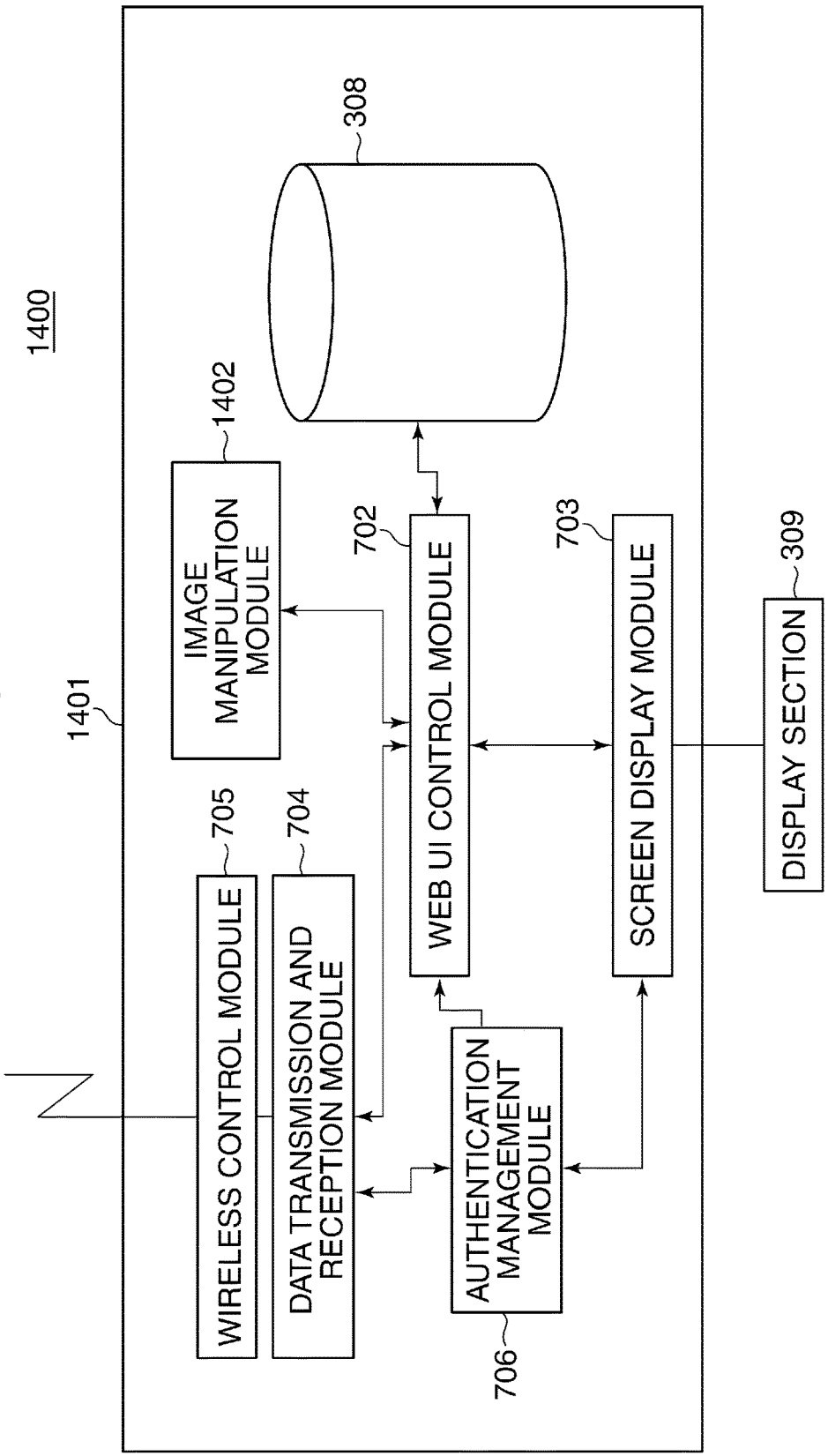
FIG. 14 is a schematic block diagram of a control module group as a group of software modules of a mobile terminal according to a second embodiment of the present invention.

FIG. 14 is a schematic block diagram of a control module group 1401 as a group of software modules of a mobile terminal 1400 according to the second embodiment.

Referring to FIG. 14, the control module group 1401 includes not only the above-described component elements of the control module group 701, but also the image manipulation module, denoted by reference numeral 1402, which manipulates a preview image acquired by the mobile terminal 1400 from the MFP 104. The processing operations of the control module group 1401 are performed by the CPU 302 executing the programs stored in the ROM 303.

Figure 15:
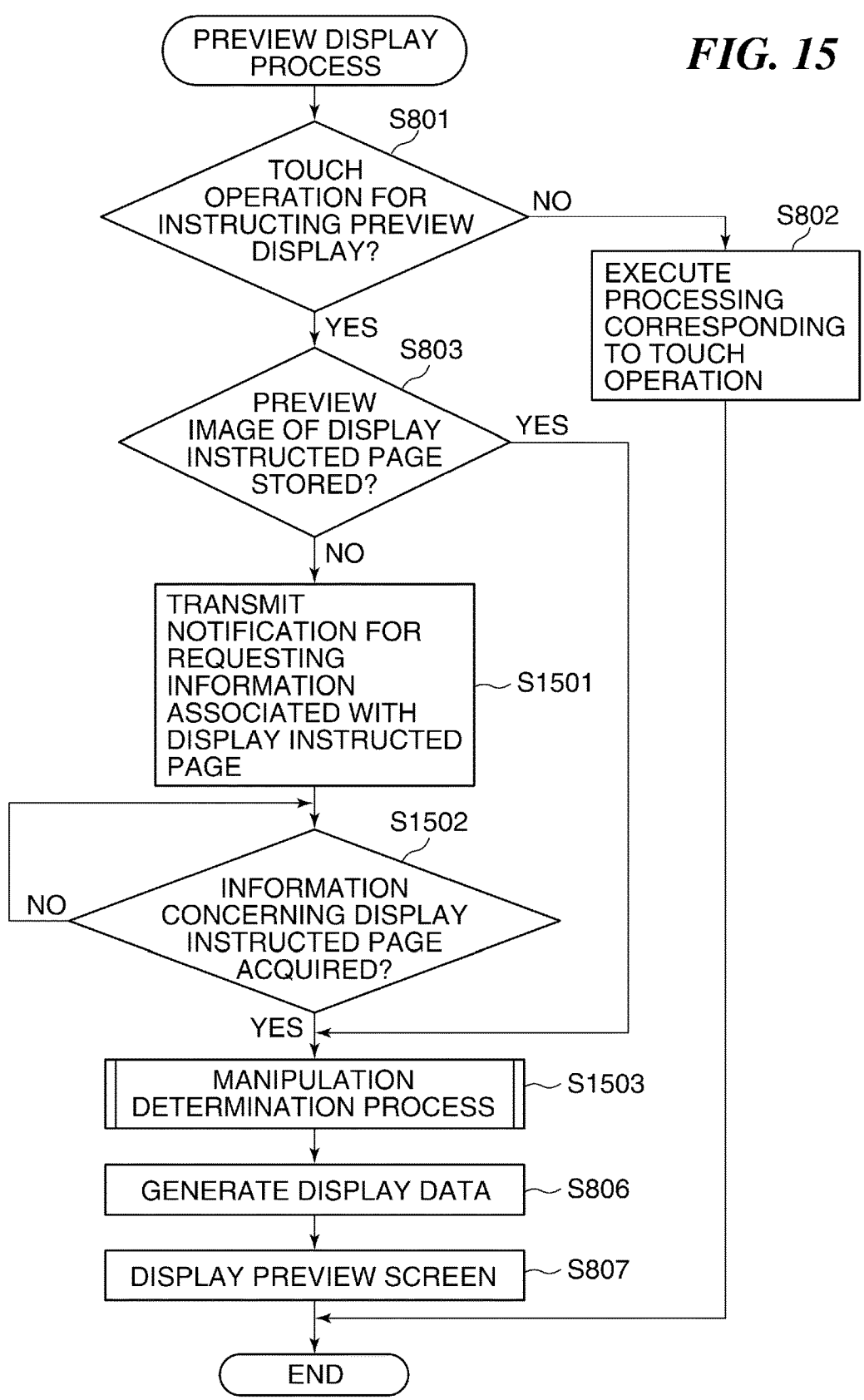
FIG. 15 is a flowchart of a preview display process performed by the mobile terminal of which the control module group is shown in FIG. 14.

FIG. 15 is a flowchart of a preview display process performed by the mobile terminal 1400, shown in FIG. 14.

The preview display process in FIG. 15 is performed by the CPU 302 of the mobile terminal 1400, executing a program stored in the ROM 303, and it is a precondition that the print data item 102 has been transmitted from the PC 101 to the server 103.

Referring to FIG. 15, first, the CPU 302 executes the steps S801 to S803 described hereinabove with reference to FIG. 8.

If it is determined in the step S803 that the preview image of the display instructed page is stored in the HDD 308, the CPU 302 performs a step S1503 et seq., described hereinafter. On the other hand, if it is determined in the step S803 that the preview image of the display instructed page is not stored in the HDD 308, the CPU 302 transmits a notification for requesting transmission of information concerning the display instructed page to the MFP 104 (step S1501). The information concerning the display instructed page includes the preview image of the display instructed page, the bibliography information 511, and the apparatus information 512. Upon receipt of the request notification, the MFP 104 performs a preview image transmission process, described hereinafter with reference to FIG. 16. If the information concerning the display instructed page is acquired from the MFP 104 (YES to a step S1502), the CPU 302 performs the manipulation determination process in FIG. 10 (step S1503). That is, in the present embodiment, the server generated image is manipulated not by the MFP 104, but by the mobile terminal 1400. Then, the CPU 302 executes the step S806 et seq.

Figure 16:
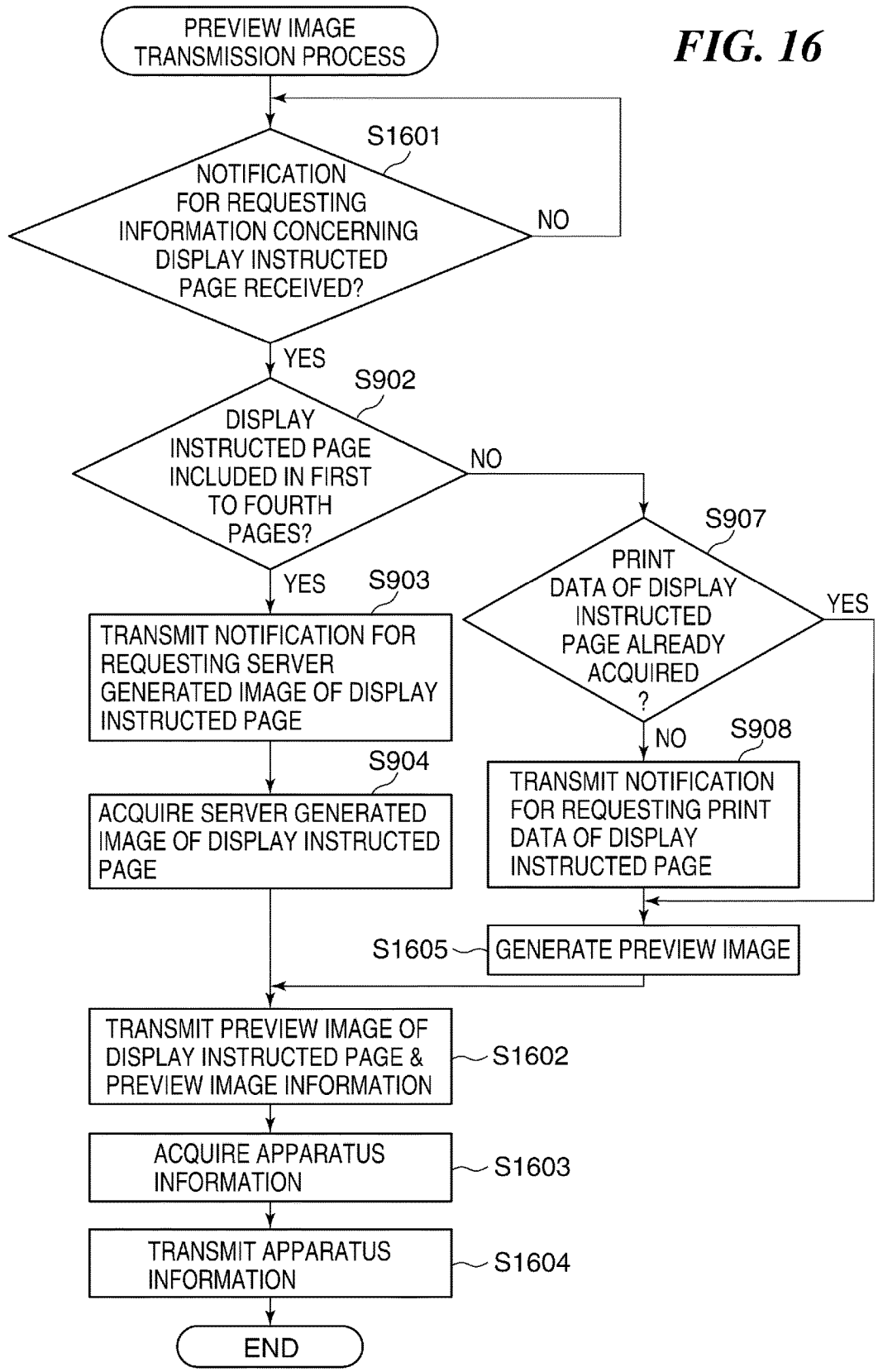
FIG. 16 is a flowchart of a preview image transmission process performed by the MFP appearing in FIG. 1.

FIG. 16 is a flowchart of the preview image transmission process performed by the MFP 104.

The preview image transmission process in FIG. 16 is performed by the CPU 202 executing a program stored in the ROM 203. Further, it is a precondition that the MFP 104 has acquired at least the bibliography information 511 from the server 103.

Referring to FIG. 16, first, the CPU 202 determines whether or not a notification for requesting transmission of the information concerning the display instructed page has been received from the mobile terminal 1400 (step S1601). If the request notification has been received from the mobile terminal 1400 (YES to the step S1601), the CPU 202 executes the step S902 described hereinabove with reference to FIG. 9.

If it is determined in the step S902 that the display instructed page is included in the "first to fourth pages", the CPU 202 executes the steps S903 and S904 described hereinabove with reference to FIG. 9. Then, the CPU 202 transmits the preview image of the display instructed page, and the preview image information 603 of the same included in the bibliography information 511, to the mobile terminal 1400 (step S1602). Then, the CPU 202 acquires the apparatus information 512 from the HDD 211 (step S1603), and transmits the acquired apparatus information 512 to the mobile terminal 1400 (step S1604). After receiving these information items, if the mobile terminal 1400 determines, based on the acquired information items, that the preview image information 603 of the display instructed page, included in the bibliography information 511, is not compatible with the apparatus information 512, the mobile terminal 1400 manipulates the preview image of the display instructed page based on the apparatus information 512. Then, the CPU 202 terminates the present process.

If it is determined in the step S902 that the display instructed page is not included in the "first to fourth pages", the CPU 202 executes the steps S907 and S908 described hereinabove with reference to FIG. 9. Then, the CPU 202 generates a preview image based on the print data item 102 of the display instructed page (step S1605), and executes the step S1602 et seq.

In the processes described above with reference to FIGS. 15 and 16, if the preview image information 603 of the display instructed page, included in the bibliography information 511, is not compatible with the apparatus information 512, the manipulated image is displayed as the preview image of the display instructed page. This makes it possible to positively perform preview display showing contents corresponding to a printed result to be obtained by the MFP 104 executing printing based on the print data item 102. Further, the mobile terminal 1400 manipulates the server generated image based on the apparatus information 512. Here, in a case where manipulation of the preview image is requested from the mobile terminal 1400 e.g. to the MFP 104 that does not perform the preview display, it requires more time and effort than necessary for transmitting and receiving data, including requesting of manipulation of the preview image from the mobile terminal 1400 e.g. to the MFP 104, and then acquiring the manipulated image from the MFP 104. As a result, it is impossible to perform the preview display with high responsiveness after receiving a user's instruction, and hence it is preferable that manipulation of the preview image is performed by an apparatus that performs the preview display. To cope with this, in the processes described above with reference to FIGS. 15 and 16, since the mobile terminal 1400 manipulates the preview image, it is possible to perform the preview display with high responsiveness after receiving a user's instruction.

Figure 17A:
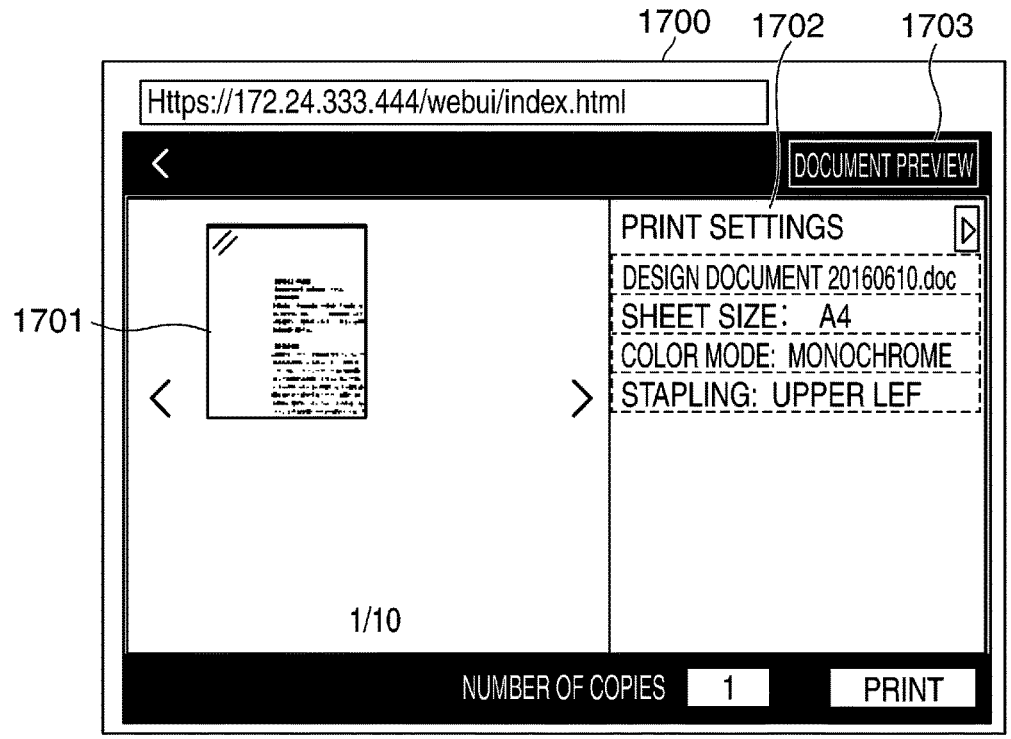
FIGS. 17A and 17B are diagrams each showing an example of a preview image displayed on the mobile terminal shown in FIG. 14.
Figure 17B:
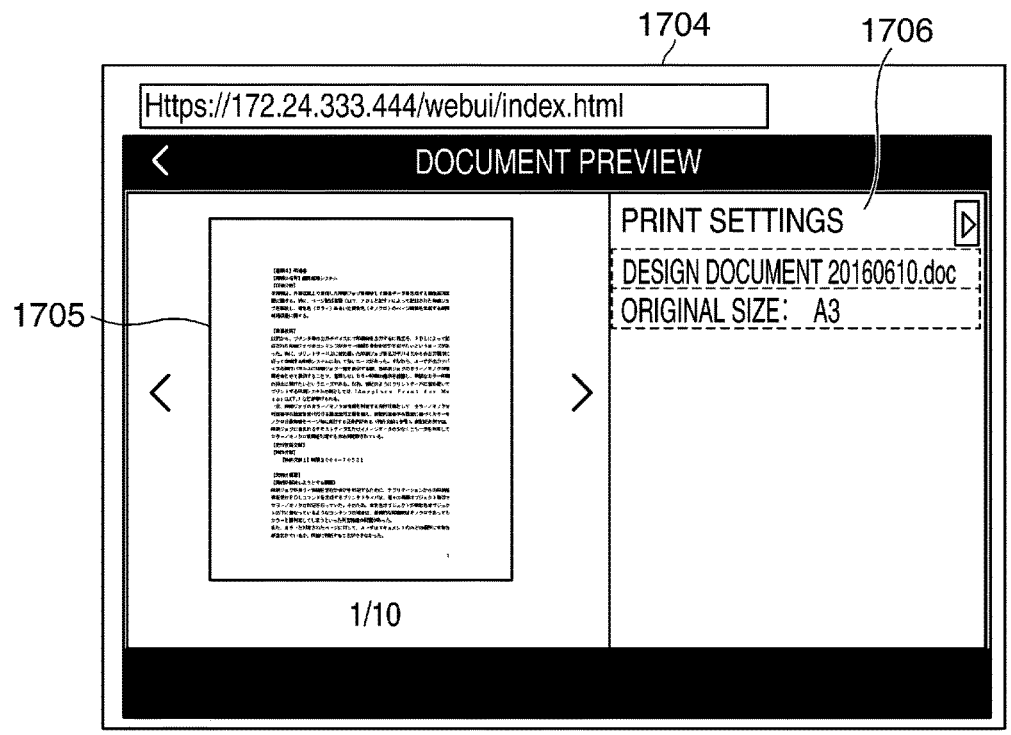

In the above-described embodiments, the display of a preview image may be switched between a manipulated image and an unmanipulated image. For example, a preview screen 1700, shown in FIG. 17A, includes not only a manipulated image 1701 and print settings 1702 associated with the manipulated image 1701, but also an operation button 1703 (switching unit) for instructing switching of the display on the display section 309. When the operation button 1703 is selected on the preview screen 1700, the display of the display section 309 is switched from the preview screen 1700 to a preview screen 1704, shown in FIG. 17B. The preview screen 1704 displays a preview image 1705 which is an image before being manipulated into the manipulated image 1701, and print settings 1706 associated with the preview image 1705. This makes it possible to notify a user of information corresponding to a result of comparison between the specifications of the print data item 102 and the specifications of the MFP 104, and further, give the user an opportunity to recognize the contents of the specifications of the print data item 102, which are not compatible with the MFP 104.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-191259 filed Sep. 29, 2016, which is hereby incorporated by reference herein in its entirety.

What is claimed is:

1. An image processing system that performs preview display of a result to be obtained by an image processing apparatus which executes processing based on execution data reserved in a communication apparatus, on a display control apparatus,
wherein the image processing system includes at least one processor and at least one memory coupled to the at least the one processor and having stored thereon instructions which, when executed by the at least the one processor, cause the at least the one processor to function as:
an acquisition unit configured to acquire a preview image generated based on the execution data and bibliography information for managing specifications of the execution data indicated by the preview image from the communication apparatus, and acquire a supported sheet size information of the image processing apparatus from the image processing apparatus;
a transmission unit configured to transmit the preview image to the display control apparatus;
a preview display unit configured to perform preview display of the result on the display control apparatus based on the transmitted preview image;
a determination unit configured to cause the image processing apparatus to determine whether or not the execution data is formed according to a predetermined language specification in a case where the sheet size indicated by the preview image generated by the communication apparatus and acquired from the bibliographic information is not included in the acquired supported sheet size information; and
a generate unit configured to generate a new preview image having a different size magnification by applying a scaling process to the preview image in a case where the determination unit determines that the execution data is formed according to the predetermined language specification, and generate a new preview image including only a part of the preview image by performing cutting processing on the preview image in a case where the determination unit determines that the execution data is not formed according to the predetermined language specification,
wherein the transmission unit transmits the new preview image to the display control apparatus.

2. The image processing system according to claim 1, wherein in a case where the new preview image has been generated by the generate unit, the preview display unit displays a warning message to the effect that the new preview image has been generated.

3. The image processing system according to claim 1, further comprising a switching unit configured to switch, in a case where the new preview image has been generated by the generate unit, the display of the preview image generated by the communication apparatus and the new preview image-generated by the generated unit.

4. An image processing apparatus that controls execution of preview display of a result to be obtained by executing processing based on execution data reserved in a communication apparatus,
wherein the image processing apparatus includes at least one processor and at least one memory coupled to the at least the one processor and having stored thereon instructions which, when executed by the at least the one processor, cause the at least the one processor to function as:
an acquisition unit configured to acquire a preview image generated based on the execution data and bibliography information for managing specifications of the execution data indicated by the preview image from the communication apparatus, and acquire a supported sheet size information of the image processing apparatus;
a transmission unit configured to transmit the preview image to a display control apparatus that performs preview display of the result;
a determination unit configured to determine whether or not the execution data is formed according to a predetermined language specification in a case where the sheet size indicated by the preview image generated by the communication apparatus and acquired from the bibliographic information is not included in the acquired supported sheet size information; and
a generate unit configured to generate a new preview image having a different size magnification by applying a scaling process to the preview image in a case where the determination unit determines that the execution data is formed according to the predetermined language specification, and generate a new preview image including only a part of the preview image by performing cutting processing on the preview image in a case where the determination unit determines that the execution data is not formed according to the predetermined language specification,
wherein the transmission unit transmits the new preview image to the display control apparatus.

5. A display control method for performing preview display of a result to be obtained by an image processing apparatus which executes processing based on execution data reserved in a communication apparatus, on a display control apparatus, comprising:
acquiring a preview image generated based on the execution data and bibliography information for managing specifications of the execution data indicated by the preview image from the communication apparatus, acquiring a supported sheet size information of the image processing apparatus from the image processing apparatus;
transmitting the preview image to the display control apparatus;
performing preview display of the result on the display control apparatus based on the transmitted preview image;
causing the image processing apparatus to determine whether or not the execution data is formed according to a predetermined language specification in a case where the sheet size indicated by the preview image generated by the communication apparatus and acquired from the bibliographic information is not included in the acquired supported sheet size information; and
generating a new preview image having a different size magnification by applying a scaling process to the preview image in a case where the image processing apparatus determines that the execution data is formed according to the predetermined language specification, and generating a new preview image including only a part of the preview image by performing cutting processing on the preview image in a case where the image processing apparatus determines that the execution data is not formed according to the predetermined language specification, wherein said transmitting includes transmitting the new preview image to the display control apparatus.

6. A non-transitory computer-readable storage medium storing a computer-executable program for executing a display control method for performing preview display of a result to be obtained by an image processing apparatus which executes processing based on execution data reserved in a communication apparatus, on a display control apparatus, wherein the display control method comprises:

acquiring a preview image generated based on the execution data and bibliography information for managing specifications of the execution data indicated by the preview image from the communication apparatus, acquiring a supported sheet size information of the image processing apparatus from the image processing apparatus;

transmitting the preview image to the display control apparatus;

performing preview display of the result on the display control apparatus based on the transmitted preview image;

causing the image processing apparatus to determine whether or not the execution data is formed according to a predetermined language specification in a case where the sheet size indicated by the preview image generated by the communication apparatus and acquired from the bibliographic information is not included in the acquired supported sheet size information; and generating a new preview image having a different size magnification by applying a scaling process to the preview image in a case where the image processing apparatus determines that the execution data is formed according to the predetermined language specification, and generating a new preview image including only a part of the preview image by performing cutting processing on the preview image in a case where the image processing apparatus determines that the execution data is not formed according to the predetermined language specification, wherein said transmitting includes transmitting the new preview image to the display control apparatus.

* * * * *